(12) United States Patent
Amundson et al.

(10) Patent No.: US 7,274,972 B2
(45) Date of Patent: Sep. 25, 2007

(54) PROGRAMMABLE CONTROLLER WITH SAVING CHANGES INDICATION

(75) Inventors: John B. Amundson, Plymouth, MN (US); Brent D. Vick, Minnetonka, MN (US); Gabriel A. Bergman, St. Louis Park, MN (US); Heidi J. Finch, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 66 days.

(21) Appl. No.: 10/726,174

(22) Filed: Dec. 2, 2003

(65) Prior Publication Data

US 2005/0119793 A1  Jun. 2, 2005

(51) Int. Cl.
G05D 23/00 (2006.01)

(52) U.S. Cl. .......................... 700/276; 700/17; 236/94; 165/267

(58) Field of Classification Search ................ 700/276, 700/17, 16, 83, 87; 236/46 R, 51, 94, 91 D, 236/91 R; 704/275; 715/708; 360/69; 165/267; 340/825.72; 345/702
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,264,034 A | 4/1981 | Hyltin et al. | |
| 4,298,946 A | 11/1981 | Hartsell et al. | |
| 4,308,991 A | 1/1982 | Peinetti et al. | |
| 4,337,822 A | 7/1982 | Hyltin et al. | |
| 4,382,544 A | 5/1983 | Stewart | |
| 4,386,649 A | 6/1983 | Hines et al. | |
| 4,388,692 A | 6/1983 | Jones et al. | |
| 4,431,134 A | 2/1984 | Hendricks et al. | |
| 4,442,972 A | 4/1984 | Sahay et al. | |
| 4,446,913 A | 5/1984 | Krocker | |
| 4,479,604 A | 10/1984 | Didner | |
| 4,503,471 A * | 3/1985 | Hanajima et al. ............. 360/69 |
| 4,506,827 A | 3/1985 | Jamieson et al. | |
| 4,606,401 A | 8/1986 | Levine et al. | |
| 4,621,336 A | 11/1986 | Brown | |
| 4,622,544 A | 11/1986 | Bially et al. | |

(Continued)

FOREIGN PATENT DOCUMENTS

EP   0678204   3/2000

(Continued)

OTHER PUBLICATIONS

Aube Technologies, TH140-28 Electronic Programmable Thermostat, Installation Instructions and User Guide, pp. 1-4, Jan. 22, 2004.

(Continued)

*Primary Examiner*—Leo Picard
*Assistant Examiner*—Steven R. Garland

(57) ABSTRACT

A programmable controller such as an HVAC controller that provides a confirmation message to a user indicating that a parameter that has been modified by the user has been or will be saved. Such a confirmation message may help assure a user that their program modifications have been accepted and/or saved by the controller, thereby reducing the anxiety some users feel when programming such controllers.

53 Claims, 27 Drawing Sheets

U.S. PATENT DOCUMENTS

| | | | |
|---|---|---|---|
| 4,717,333 A | 1/1988 | Carignan | |
| 4,725,001 A | 2/1988 | Carney et al. | |
| 4,837,731 A | 6/1989 | Levine et al. | |
| 4,881,686 A | 11/1989 | Mehta | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,012,973 A | 5/1991 | Dick et al. | |
| 5,038,851 A | 8/1991 | Metha | |
| 5,053,752 A | 10/1991 | Epstein et al. | |
| 5,065,813 A | 11/1991 | Berkeley et al. | |
| 5,088,645 A | 2/1992 | Bell | |
| 5,140,310 A | 8/1992 | DeLuca et al. | |
| 5,161,606 A | 11/1992 | Berkeley et al. | |
| 5,181,653 A | 1/1993 | Foster et al. | |
| 5,187,797 A * | 2/1993 | Nielsen et al. | 715/708 |
| 5,230,482 A | 7/1993 | Ratz et al. | |
| 5,238,184 A | 8/1993 | Adams | |
| 5,251,813 A | 10/1993 | Kniepkamp | |
| 5,259,445 A | 11/1993 | Pratt et al. | |
| 5,329,991 A | 7/1994 | Metha et al. | |
| 5,348,078 A | 9/1994 | Dushane et al. | |
| 5,386,577 A | 1/1995 | Zenda | |
| 5,414,618 A * | 5/1995 | Mock et al. | 700/16 |
| 5,482,209 A | 1/1996 | Cochran et al. | |
| 5,526,422 A | 6/1996 | Keen | |
| 5,537,106 A | 7/1996 | Mitcuhashi | |
| 5,566,879 A | 10/1996 | Longtin | |
| 5,570,837 A | 11/1996 | Brown et al. | |
| 5,673,850 A | 10/1997 | Uptegraph | |
| 5,782,296 A | 7/1998 | Metha | |
| 5,873,519 A | 2/1999 | Beilfuss | |
| 5,902,183 A | 5/1999 | D'Souza | |
| 5,937,942 A | 8/1999 | Bias et al. | |
| 5,947,372 A | 9/1999 | Tiernan | |
| 5,950,709 A | 9/1999 | Krueger et al. | |
| 6,009,355 A | 12/1999 | Obradovich et al. | |
| 6,032,867 A | 3/2000 | Dushane et al. | |
| 6,081,197 A | 6/2000 | Garrick et al. | |
| 6,101,824 A | 8/2000 | Meyer et al. | |
| 6,121,875 A | 9/2000 | Hamm et al. | |
| 6,196,467 B1 | 3/2001 | Dushane et al. | |
| 6,208,331 B1 | 3/2001 | Singh et al. | |
| 6,216,956 B1 | 4/2001 | Ehlers et al. | |
| 6,236,326 B1 | 5/2001 | Murphy | |
| 6,290,140 B1 | 9/2001 | Pesko et al. | |
| 6,315,211 B1 | 11/2001 | Sartain et al. | |
| 6,318,639 B1 | 11/2001 | Toth | |
| 6,351,693 B1 | 2/2002 | Monie et al. | |
| 6,398,118 B1 | 6/2002 | Rosen et al. | |
| 6,502,758 B2 | 1/2003 | Cottrell | |
| 6,518,957 B1 | 2/2003 | Lehtinen et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,595,430 B1 | 7/2003 | Shah | |
| 6,786,421 B2 | 9/2004 | Rosen | |
| 2001/0042684 A1 | 11/2001 | Essalik et al. | |
| 2001/0052459 A1 | 12/2001 | Essalik et al. | |
| 2002/0005435 A1 | 1/2002 | Cottrell | |
| 2002/0092779 A1 | 7/2002 | Essalik et al. | |
| 2002/0096572 A1 | 7/2002 | Chene et al. | |
| 2002/0173929 A1 | 11/2002 | Seigel | |
| 2003/0034897 A1 | 2/2003 | Shamoon et al. | |
| 2003/0034898 A1 | 2/2003 | Shamoon et al. | |
| 2003/0121652 A1 | 7/2003 | Carey et al. | |
| 2003/0123224 A1 | 7/2003 | LaCriox et al. | |
| 2003/0142121 A1 | 7/2003 | Rosen | |
| 2003/0150926 A1 | 8/2003 | Rosen | |
| 2003/0150927 A1 | 8/2003 | Rosen | |
| 2003/0177012 A1 * | 9/2003 | Drennan | 704/275 |
| 2004/0074978 A1 | 4/2004 | Rosen | |
| 2004/0193324 A1 * | 9/2004 | Hoog et al. | 700/276 |
| 2004/0245352 A1 | 12/2004 | Smith | |
| 2004/0262410 A1 * | 12/2004 | Hull | 236/91 R |

FOREIGN PATENT DOCUMENTS

| | | |
|---|---|---|
| WO | WO 01/93779 | 12/2001 |

OTHER PUBLICATIONS

Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, prior to filing date of present application.
Carrier Microelectronic Programmable Thermostat Owner's Manual, pp. 1-24, May 1994.
Carrier TSTATCCRF01 Programmable Digital Thermostat, pp. 1-21, prior to filing date of present application.
Danfoss RT51/51RF & RT52/52RF User Instructions, 2 pages, Jun. 2004.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Ritetemp Operation 8029, 3 pages, Jun. 19, 2000, pp. 2, 4, 6.
Ritetemp Operation 8050, 5 pages, Jun. 26, 2002, pp. 2, 4, 6, 8.
Ritetemp Operation 8085, pp. 1-6, prior to filing date of present application.
Sealed Unit Parts Co., Inc., Supco & CTC Thermostats . . . loaded with features, designed for value!, 6 pages, prior to filing date of present application.
Totaline Model P474-1035 Owner's Manual Programmable 5-2 Day Digital Thermostat, pp. 1-21, prior to filing date of present application.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to filing date of present application.
White-Rodgers 1F80-224 Programmable Electronic Digital Thermostat, Installation and Operation Instructions, 8 pages, prior to filing date of present application.
White-Rodgers Installation Instructions for Heating & Air Conditioning 1F78 Non-Programmable Thermostat, 6 pages, prior to filing date of present application.
Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8, 1998.

Carrier, "Thermidistat Control, Installation, Start-Up, and Operating Instructions,"pp. 1-12, Aug. 1999.
CorAccess, "Companion 6," User Guide, pp. 1-20, Jun. 17, 2002.
Hunter, "44200/44250," Owner's Manual, 32 pages, printed prior to filing date.
Hunter, "44300/44350," Owner's Manual, 35 pages, printed prior to filing date.
Hunter, "Auto Saver 550", Owner's Manual Model 44550, 44 pages, printed prior to filing date.
METASYS, "HVAC PRO for Windows User's Manual," 308 pages, 1998.
http://www.ritetemp.info/rtMenu_13.html, Rite Temp 8082, 8 pages, printed Jun. 20, 2003.
Totaline, "1 For All programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Warmly Yours, "Model TH111GFCI-P (120 VAC)," Manual, pp. 1-4, printed prior to filing date.
White-Rodgers, "Installation Instructions for Heating & Air Conditioning IF72 5/2 Day Programmable Heat Pump Thermostat," 8 pages, printed prior to filing date.
White-Rodgers, "Installation Instructions for Heating & Air Conditioning IF78 5/2 Day Programmable Thermostat," 7 pages, printed prior to filing date.
White-Rodgers, "Comfort-Set 90 Series Thermostat," Manual, pp. 1-24, printed prior to filing date.
White-Rodgers, "Comfort-Set III Thermostat," Manual, pp. 1-44, printed prior to filing date.
White-Rodgers, 1F80-240 "for (Heating Only systems) Programmable Electronic Digital Thermostat," Installation and Operation Instructions, 8 pages, printed prior to filing date.
White-Rodgers, 1F80-241 "Programmable Electronic Digital Thermostat," Installation and Operation Instructions, 6 pages, printed prior to filing date.
White-Rodgers, 1F80-261 "Programmable Electronic Digital Thermostat," Installation and Operation Instructions, 8 pages, printed prior to filing date.
White-Rodgers, 1F81-261 "Programmable Electronic Digital Multi-Stage Thermostat," Installation and Operation Instructions, 8 pages, printed prior to filing date.
White-Rodgers, 1F82-261 "Programmable Electronic Digital Heat Pump Thermostat," Installation and Operation Instructions, 8 pages, printed prior to filing date.
Prolifix Inc., "Web Enabled IP Thermostats," 2 pages, prior to filing date of present application.
ADT Security Systems, "iCenter Advanced User Interface 8142ADT User Guide," pp. 1-136, 2001.
DeKoven et al., "Measuring Task Models in Designing Intelligent Products," pp. 188-189, 2002.
http://www.hometoys.com/htinews/apr99/releases/hal01.htm, HTI News Release, pp. 1-3, printed Oct. 28, 2004.
U.S. Appl. No. 10/440,474, filed May 15, 2003, entitled "Reverse Images in a Dot Matrix LCD for an Evironmental Control Device."
U.S. Appl. No. 10/654,230, filed Sep. 3, 2003, entitled "Programmable Thermostat Incorporating a Liquid Crystal Display and Having a Feature for Mounting Horizontally, Vertically and any Intermediate Orientation."
U.S. Appl. No. 10/654,235, filed Sep. 3, 2003, entitled "Programmable Thermostat Incorporating a Liquid Crystal Display Selectively Presenting Adaptable System Menus Including Changeable Interactive Virtual Buttons."
Blister Pack Insert from a Ritetemp 8082 Touch Screen Thermostat Product, 2 pages, 2002.
Operation Manual for Ritetemp Touch Screen Thermostat 8082, 8 pages, 2002.
Trouble Shooting Guide for Ritetemp Thermostat 8082, 1 page, 2002.
Quick Start Guide for Ritetemp Thermostat 8082, 1 page, 2002.
Install Guide for Ritetemp Thermostat 8082, 6 pages, 2002.
Remote Control Power Requirement for Ritetemp Thermostat 8082, 1 page, 2002.
Mounting Template for Ritetemp Thermostat 8082, 1 page, 2002.

* cited by examiner

PROGRAMMABLE CONTROLLER WITH SAVING CHANGES INDICATION

TECHNICAL FIELD

The present invention relates generally to the field of programmable controllers for homes and/or buildings and their related grounds. More specifically, the present invention relates to such controllers that permit a user to modify a parameter, such as a scheduling parameter, of the controller.

BACKGROUND

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

HVAC controllers, for example, are employed to monitor and, if necessary, control various environmental conditions within a home, office, or other enclosed space. Such devices are useful, for example, in regulating any number of environmental conditions with a particular space including for example, temperature, humidity, venting, air quality, etc. The controller may include a microprocessor that interacts with other components in the system. For example, in many modern thermostats for use in the home, a controller unit equipped with temperature and humidity sensing capabilities may be provided to interact with a heater, blower, flue vent, air compressor, humidifier and/or other components, to control the temperature and humidity levels at various locations within the home. A sensor located within the controller unit and/or one or more remote sensors may be employed to sense when the temperature or humidity reaches a certain threshold level, causing the controller unit to send a signal to activate or deactivate one or more component in the system.

The controller may be equipped with an interface that allows the user to monitor and adjust the environmental conditions at one or more locations within the building. With more modern designs, the interface typically includes a liquid crystal display (LCD) panel inset within a housing that contains the microprocessor as well as other components of the controller. In some designs, the interface may permit the user to program the controller to activate on a certain schedule determined by the user. For example, the interface may include a separate menu routine that permits the user to change the temperature at one or more times during a particular day. Once the settings for that day have been programmed, the user can then repeat the process to change the settings for the other remaining days.

It has been found that many users find programming their programmable controllers to be confusing, time consuming and often complex. As a result, many users do simply not use the programmable scheduling capabilities of their controllers, and instead run in a constant temperature mode where the potential energy savings of an appropriate energy saving schedule are not realized. One difficulty is that some users, when attempting to review the programmed schedule, are unsure if they are inadvertently changing the schedule. Likewise, some users, when attempting to program the schedule, are unsure if their changes are accepted by the controller. Accordingly, there is an ongoing need in the art to decrease the confusion often associated with programming a programmable controller.

SUMMARY

Generally, the present invention relates to an interface for a programmable controller that permits a user to modify a parameter, such as a scheduling parameter, and provide an indication to the user that the modified parameter has been accepted and/or saved.

In an illustrative embodiment, a programmable controller is provided with a user interface. The programmable controller may by any type of programmable controller including, for example, an HVAC controller, a security system controller, a lawn sprinkler controller, a lighting system controller, or any other programmable controller, depending on the application. The user is allowed to modify one or more parameters of the programmable controller. Once modified, the programmable controller may provide an indication to the user that the change or changes have been accepted and/or saved. The indication may be a visible, audible, or any other suitable indication, as desired. Such an indication may help assure a user that their program modifications have been accepted and/or saved by the controller, thereby reducing the anxiety some users feel when programming such controllers.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
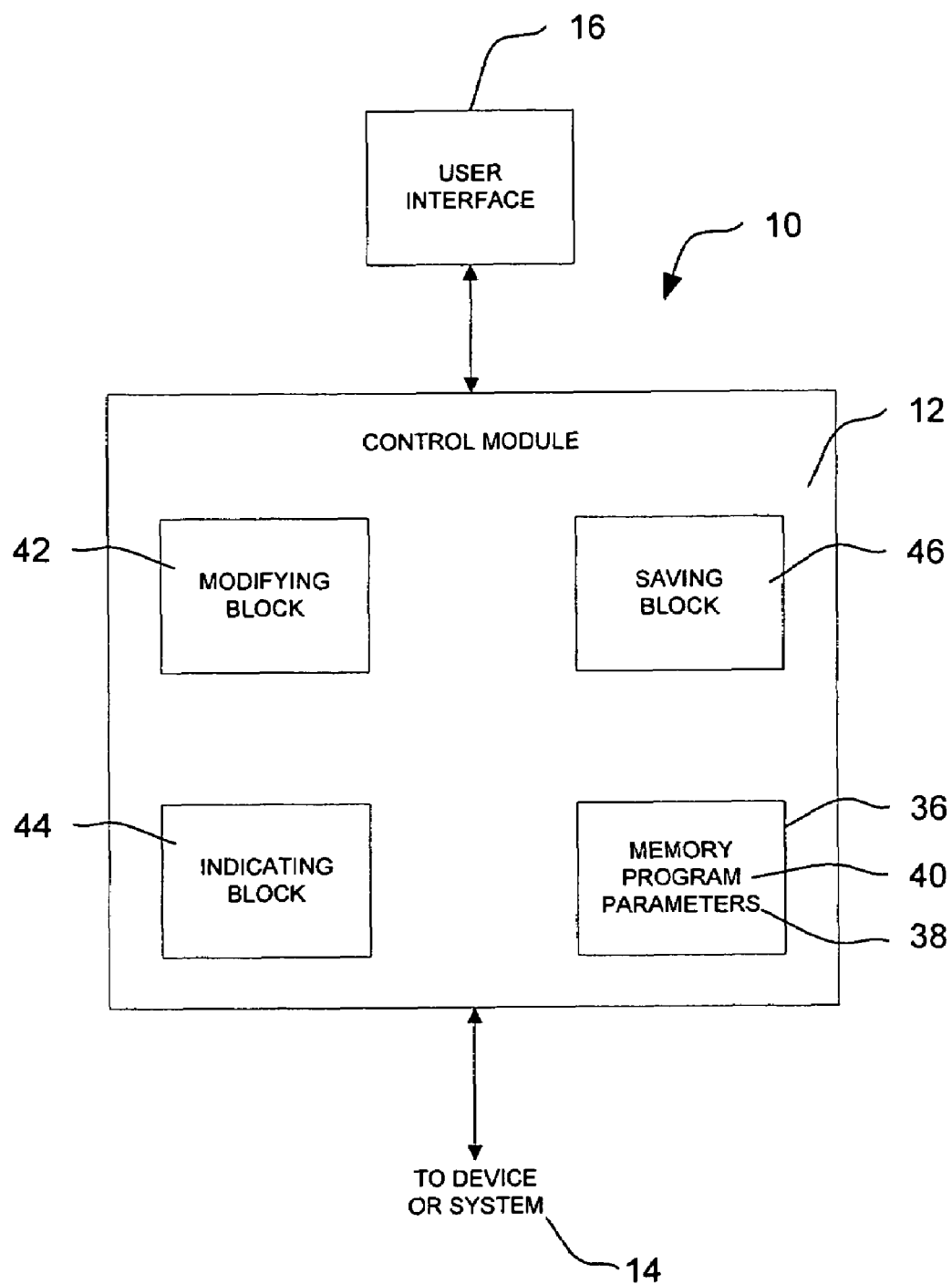
FIG. 1 is a block diagram of a programmable controller in accordance with an illustrative embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Generally, the present invention relates to simplified interfaces for controllers having programming capabilities. These controllers can be used in a variety of systems such as, for example, HVAC systems, sprinkler systems, security systems, lighting systems, and the like. Many of the figures depict HVAC controllers. While the present invention is not so limited, an appreciation of various aspects of the invention will be gained through a discussion of the examples provided below.

Referring now to FIG. 1, which shows a programmable controller 10 in accordance with one illustrative embodiment of the present invention. Controller 10 includes a control module 12 that is configured to monitor and control any variety of device or system 14. Controller 10 also includes a user interface 16 that is configured to provide communication between control module 12 and a user. User interface 16 can be used to communicate status of device or system 14 to the user, and/or accept input from the user. Examples of inputs that can be received from the user include changes to one or more program parameters 38, such as schedule parameters, of the control module 12.

Figure 2:
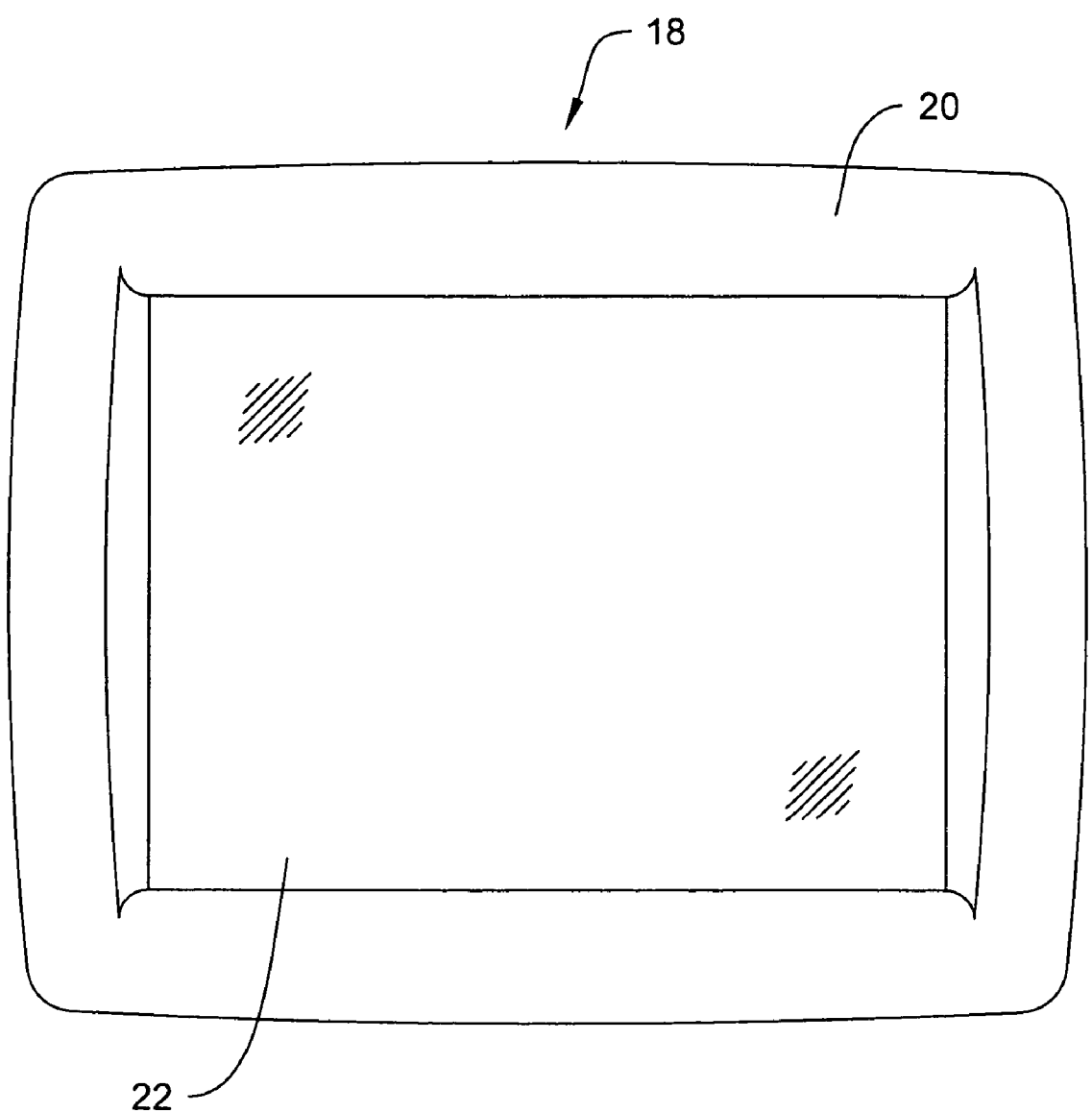
FIG. 2 is a schematic drawing of an illustrative interface of a programmable controller in accordance with the present invention.

User interface 16 can take a wide variety of different forms. User interface 16 can include one or more of an alpha-numeric display, a graphical display, and/or a key pad having one or more keys or buttons. In some embodiments, User interface 16 can include a touch screen. FIG. 2 illustrates an HVAC controller 18 that includes a housing 20 and a touch screen 22. Touch screen 22 can be used both to display appropriate information to the user as well as accept information from the user, as desired.

Figure 3:
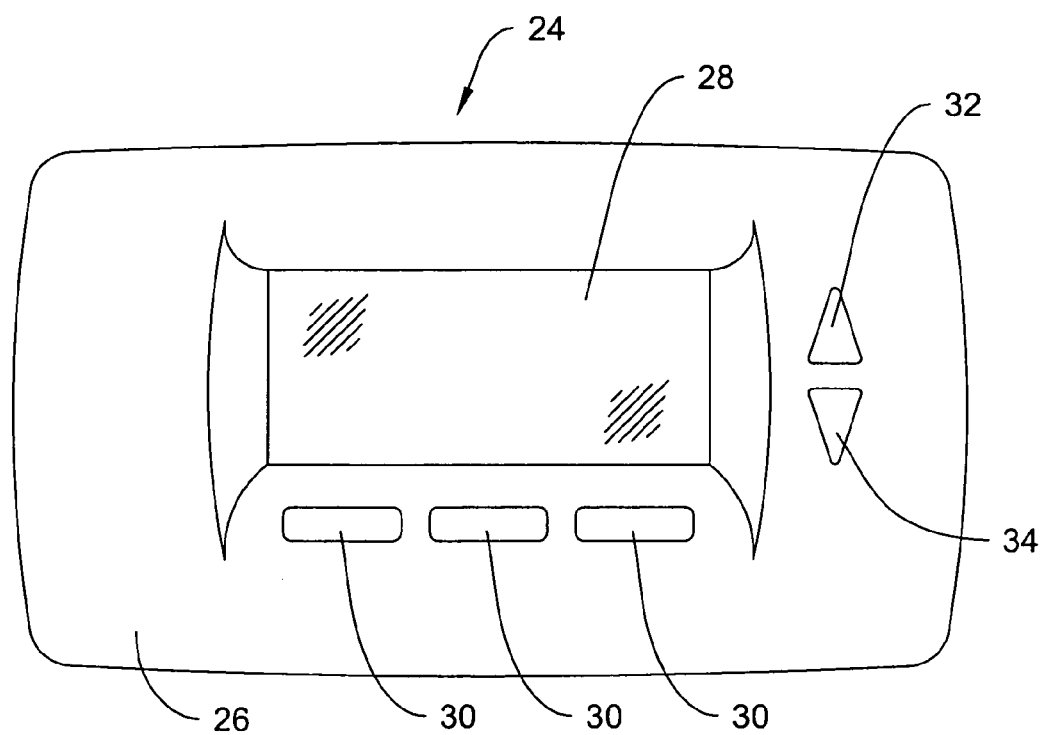
FIG. 3 is a schematic drawing of another illustrative interface of a programmable controller in accordance with the present invention.

In other embodiments, user interface 16 can include a display screen and one or more buttons. FIG. 3 illustrates an illustrative HVAC controller 24 that includes a housing 26 and a display 28. Display 28 can be an LED display, an LCD display, or any other suitable display format discernible to the human eye. HVAC controller 24 also includes buttons 30 that can be used for selecting one or more parameters, as will be discussed in greater detail below. HVAC controller 24 also includes an up button 32, which can be used for increasing the value of a selected parameter, and a down button 34 that can be used for decreasing the value of a selected parameter.

With reference to FIG. 1, control module 12 includes a memory block 36 that can store the value of one or more parameters 38. Memory block 36 also may store the program 40 that controls the operations of controller 10 and hence the operations of device or system 14.

When controller 10 is an HVAC controller, program 40 can include instructions to turn HVAC equipment 14 on or off based on a timed schedule. The timed schedule can be configured to provide for continuous control throughout the day, or the timed schedule can be configured to provide for several time periods each day. Each time period can have a different set of set points. In some embodiments, the timed schedule can include four periods that correspond to, for example in residential use, when a user is likely to wake up in the morning, leave for work, return from work, and go to sleep. These periods are often referred to as the WAKE, LEAVE, RETURN, and SLEEP periods.

Program 40 can include provisions to accommodate these or other time periods. Each of the starting times and temperature set points, i.e. parameters 38, for each time period can be placed into memory within memory block 36. Once programmed, these parameters 38 can remain unchanged. In some situations, it is desirable for the user to be able to change one or more of these parameters 38.

As such, control module 12 may include a modifying block 42, an indicating block 44 and a saving block 46. Modifying block 42 can include circuitry or software that permits a user to make changes to one or more of the parameters 38. Indicating block 44 includes circuitry or software that permits, in conjunction with saving block 46, controller 10 to communicate to the user that the user's changes to parameters 38 have been or will be saved. Illustrative interactions between modifying block 42, indicating block 44 and saving block 46 are further illustrated below with respect to, for example, FIG. 4 through FIG. 8.

Figure 4:
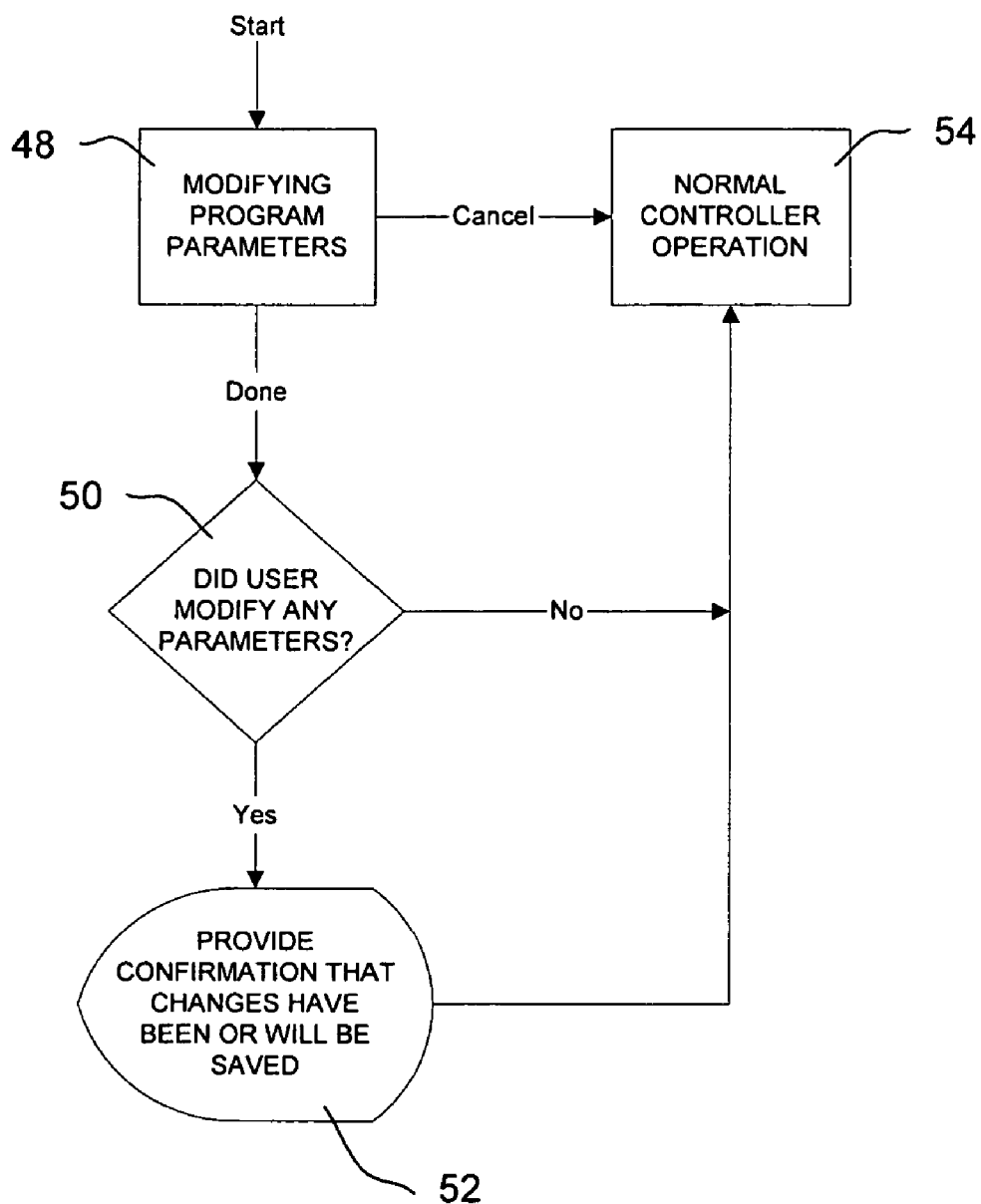
FIG. 4 is a flow diagram showing an illustrative method that may be implemented by the programmable controller of FIG. 1.

FIG. 4 is a flow diagram showing an illustrative method that may be implemented by the programmable controller FIG. 1. At block 48, a user is permitted to enter one or more parameters and/or parameter modifications via the user interface 16 (see FIG. 1). Block 50 determines if any parameters were added or modified. If no parameters were added or modified, control passes to block 54, representing normal operation of the controller 10 (see FIG. 1). However, if one or more parameters were added or changed, control passes to display block 52.

At display block 52, the controller 10 (see FIG. 1) provides confirmation to the user that the changes made to parameters 38 (see FIG. 1) have been or will be saved. In some embodiments, the changes can be saved prior to providing confirmation to the user. In other embodiments, the changes can be saved after or substantially simultaneously with providing confirmation to the user.

The step of providing confirmation to the user can take a variety of forms. Indicating block 44 of FIG. 1 can provide a text message to the user, through user interface 16 (see FIG. 1). The text message can simply read "changes saved", or something similar. Alternatively, indicating block 44 (see FIG. 1) can provide an audio message, a graphical message or icon, or any other suitable confirmation message, as desired.

Figure 5:
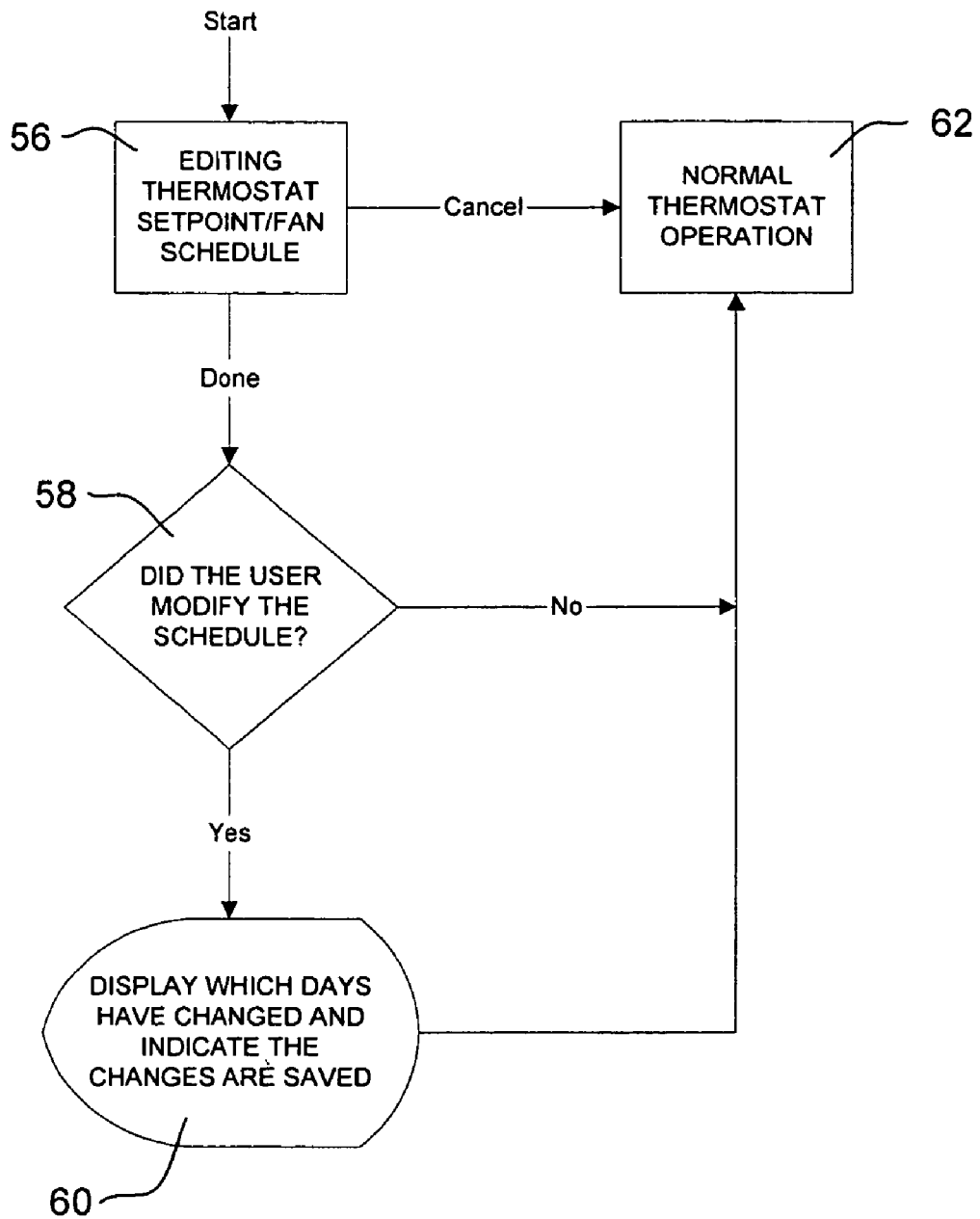
FIG. 5 is a flow diagram showing an illustrative HVAC method that may be implemented by the programmable controller of FIG. 1.

FIG. 5 is a flow diagram showing an illustrative method that may be implemented by the programmable controller of FIG. 1. In this illustrative flow diagram, the controller 10 (see FIG. 1) is an HVAC controller such as a programmable thermostat. At block 56, a user is permitted to edit the HVAC set points and/or schedule. This can encompass entering new values for one or more of parameters 38 (see FIG. 1) through user interface 16 (see FIG. 1). If no changed values are detected at decision block 58, control passes to block 62, representing normal operation of the HVAC controller 10 (see FIG. 1). However, if changed values are detected at decision block 58, control passes to display block 60.

At display block 50, the HVAC controller 10 (see FIG. 1) provides confirmation to the user that the changes made to parameters 38 (see FIG. 1) are saved. In some cases, one or more set points and/or schedule parameters are changed for only certain days of the week. In such cases, the HVAC controller 10 (see FIG. 1) may also provide a notification of which days were modified. Indicating block 44 (see FIG. 1) can provide a text message or any other suitable message to the user, through user interface 16 (see FIG. 1).

Figure 6:
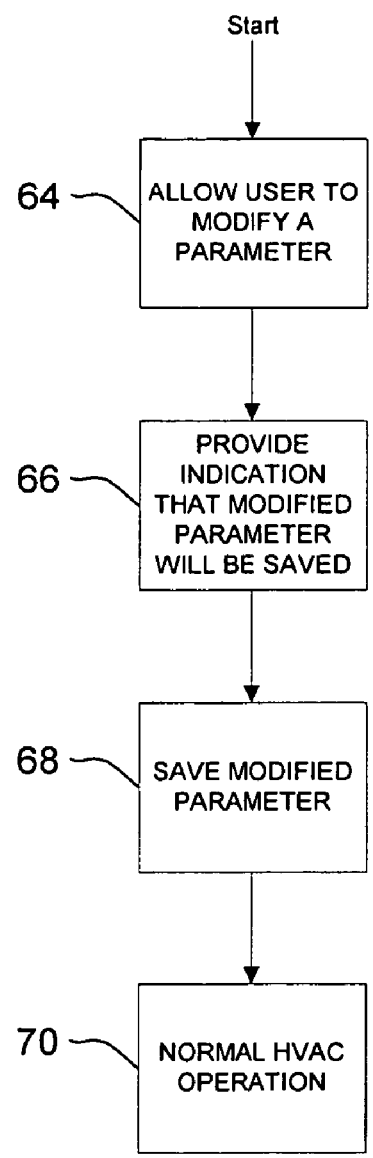
FIG. 6 is a flow diagram showing another illustrative HVAC method that may be implemented by the programmable controller of FIG. 1.
Figure 7:
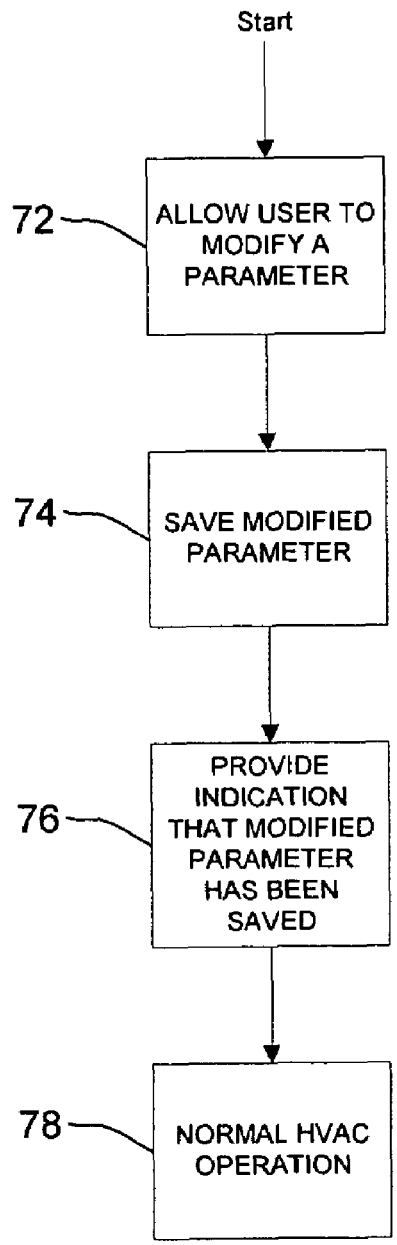
FIG. 7 is a flow diagram showing another illustrative HVAC method that may be implemented by the programmable controller of FIG. 1.

As discussed above with respect to FIG. 4, a confirmatory message can be provided before, after, or simultaneously with saving block 46 (see FIG. 1) actually saving changes to parameters 38 (see FIG. 1). FIGS. 6 and 7 explicitly describe processes in which the changes are saved after providing a confirmatory message (FIG. 6) or prior to providing the message (FIG. 7).

In FIG. 6, a user is allowed to modify one or more parameters at block 64. Once the changes have been entered by the user, control passes to block 66, at which time indicating block 44 (see FIG. 1) provides an indication that the modified parameter (or parameters) will be saved. The modified parameter or parameters are subsequently saved at block 68. In the illustrative embodiment, control then passes to block 70, at which time normal HVAC operation may resume.

In FIG. 7, a user is allowed to modify one or more parameters at block 72. Once the changes have been entered, control passes to block 74, at which time saving block 46 (see FIG. 1) saves the modified parameter or parameters. Control passes to block 76, at which time indicating block 44 (see FIG. 1) provides an indication that the modified parameter or parameters have been saved. In the illustrative embodiment, control then passes to block 78, at which normal HVAC operation may resume.

Figure 8:
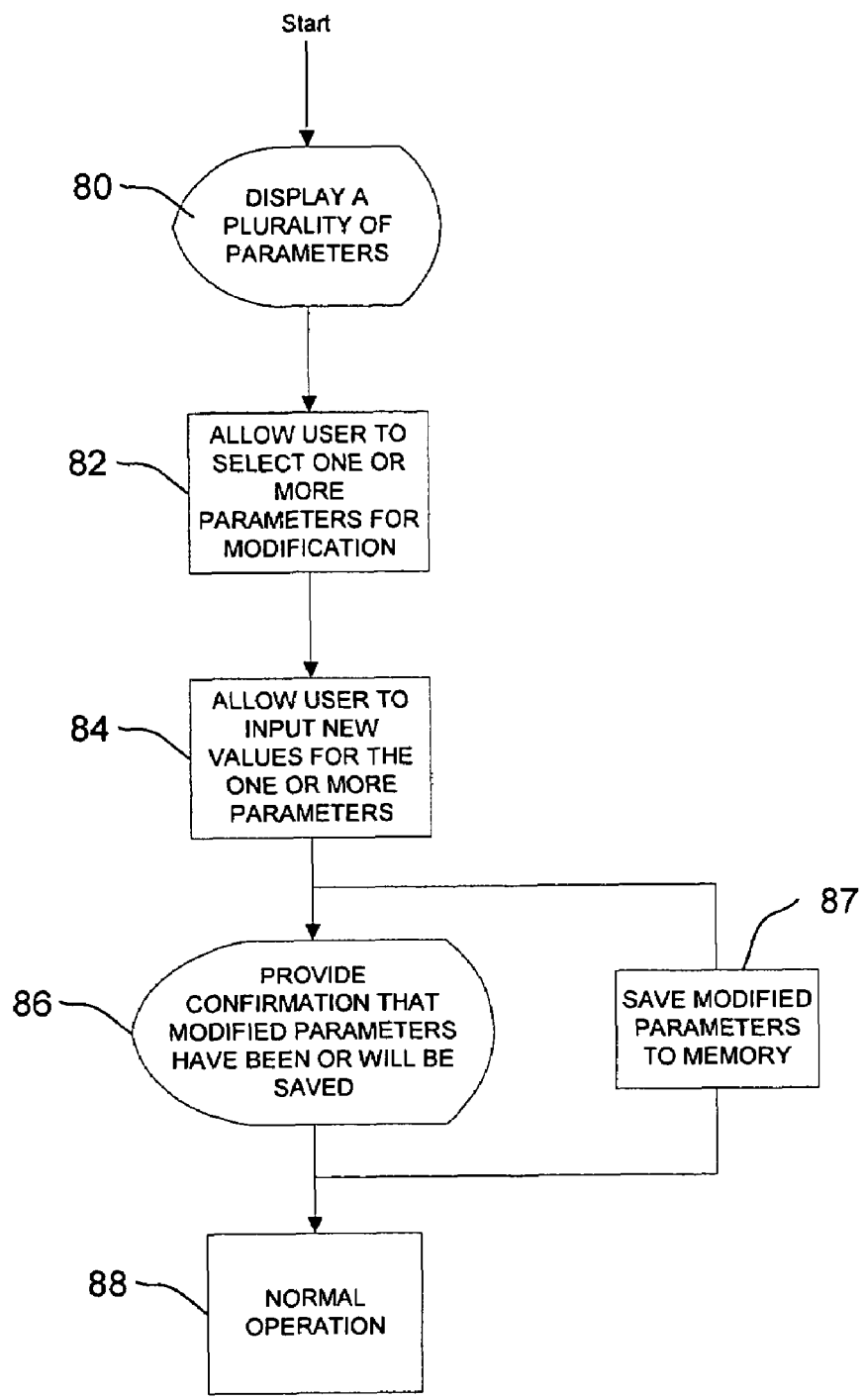
FIG. 8 is a flow diagram showing another illustrative HVAC method that may be implemented by the programmable controller of FIG. 1.

With respect to FIG. 8, a flow diagram is shown that illustrates an embodiment in which an HVAC controller 10 (see FIG. 1) displays a plurality of parameters from which a user can choose to modify. At display block 80, a plurality of parameters are displayed by user interface 16 (see FIG. 1). Control passes to block 82, where the user is allowed to select one or more of the parameters to be modified. Control passes to block 84, where the user is allowed to enter new values for the one or more selected parameters. Control then passes to display block 86, where indicating block 44 (FIG. 1) provides confirmation that the modified parameters have been or will be saved. The modified parameters are also saved to memory, as shown at block 87. In some embodiments, the changes can be saved prior to providing confirmation to the user. In other embodiments, the changes can be saved after or substantially simultaneously with providing confirmation to the user. In the illustrative embodiment, control is then passed to block 88, which represents normal HVAC operation.

Figure 9:
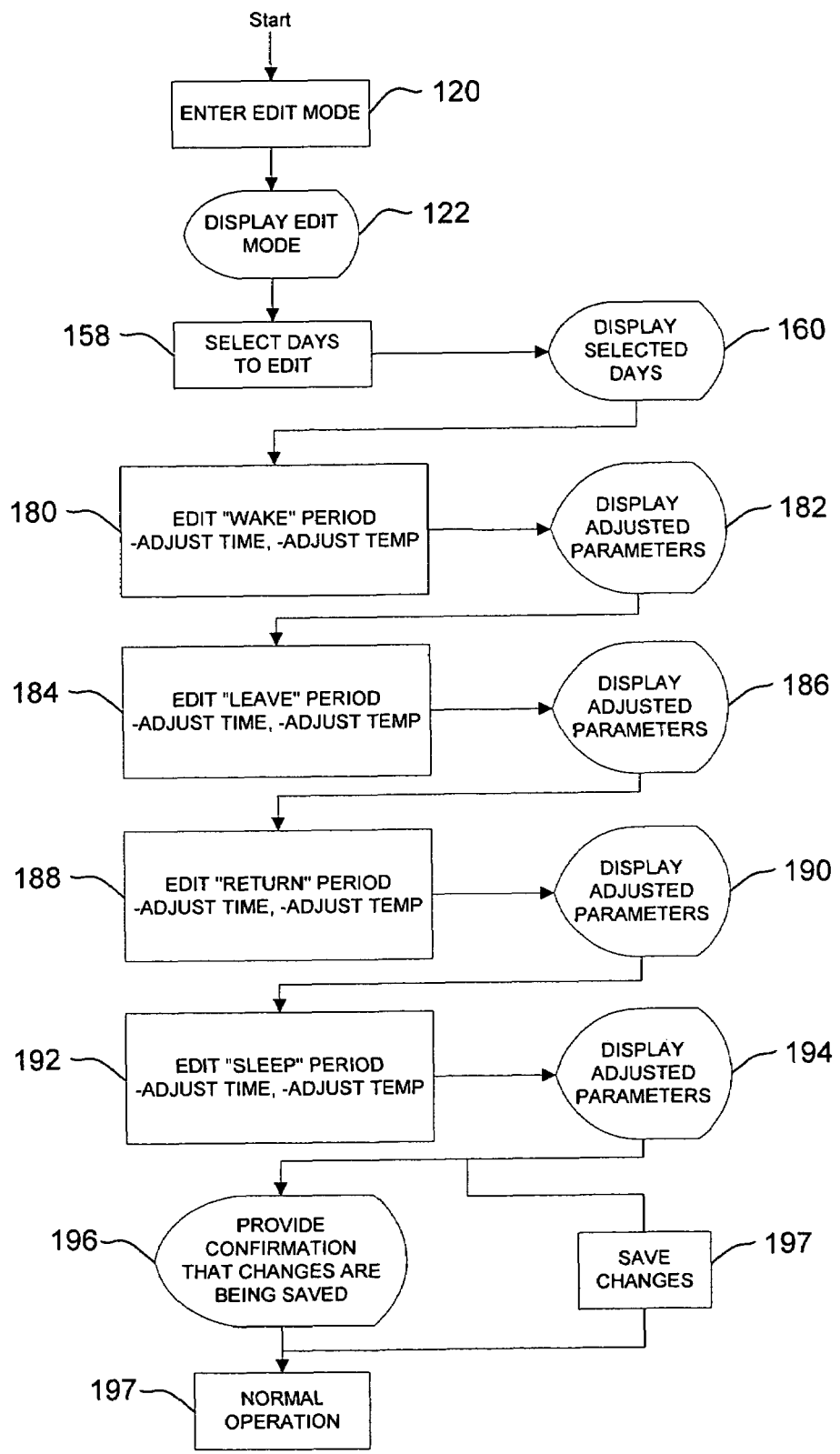
FIG. 9 is a flow diagram showing yet another illustrative HVAC method that may be implemented by the programmable controller of FIG. 1.

FIG. 9 is a flowchart showing a step-by-step process of updating one or more parameters in accordance with an illustrated embodiment of the present invention. FIGS. 10–18 are schematic drawings of an HVAC controller, corresponding to the illustrative method of FIG. 9. It should be noted that FIGS. 10–18 illustrate an HVAC controller having particular icons displayed in particular locations. It is important to note that these positions are merely illustrative and are not intended to be limiting in any manner or fashion.

Figure 10:
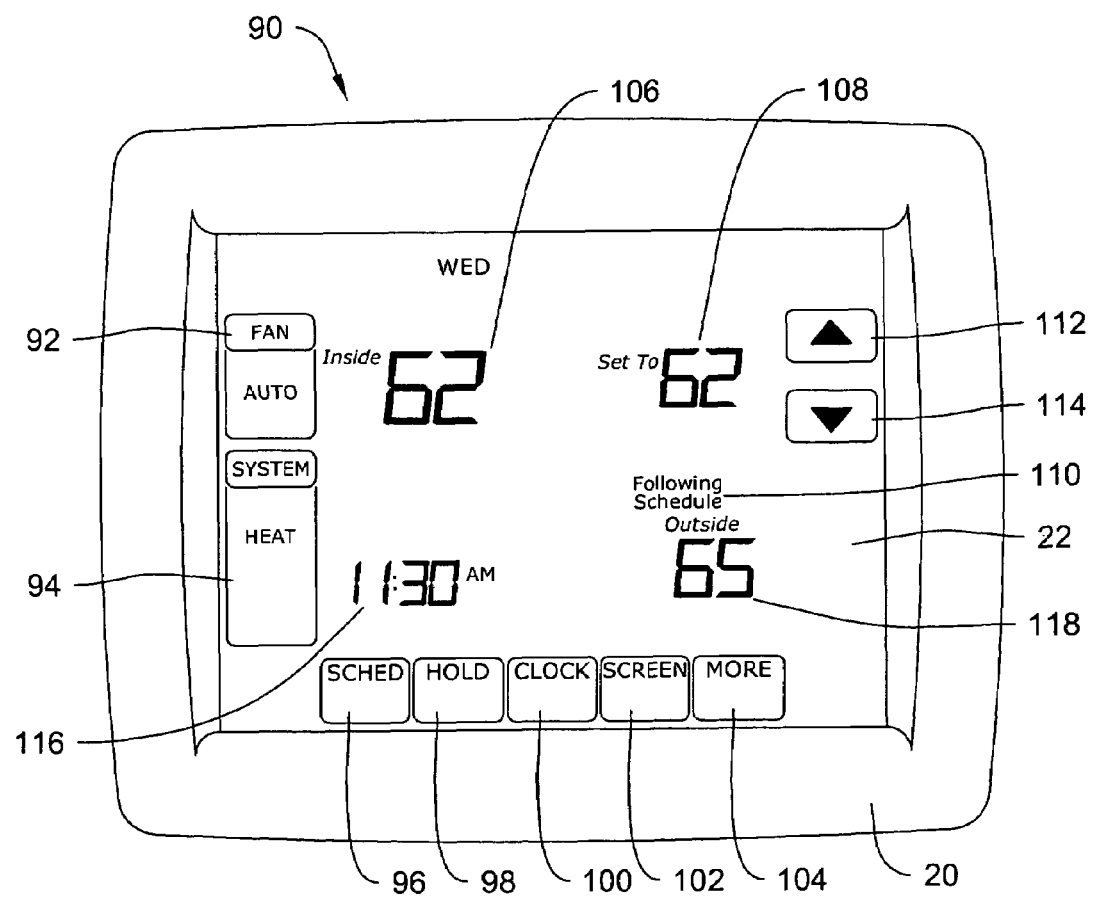
FIGS. 10–18 are schematic drawings of an HVAC controller, corresponding to the illustrative method of FIG. 9.

FIG. 10 illustrates a thermostat 90 having a housing 20 and a touch screen 22. Touch screen 22 can display information to the user as well as accept inputs from the user. The user can make selections by touching appropriate portions of touch screen 22, as will be described in greater detail below.

As illustrated, touch screen 22 emulates a number of buttons commonly found on thermostats. Along the left side of touch screen, a fan selection icon 92 and a system icon 94 permit a user to select from a variety of fan and heating options. For example, the user can scroll through fan ON, fan AUTO and fan CIRC, which will cause HVAC equipment 14 to run a fan continuously, only when the system is actively heating or cooling, or on a predetermined schedule, respectively. Similarly, the user can scroll through emergency HEAT, HEAT, or COOL by employing system icon 94.

In the illustrated embodiment, touch screen 22 includes several button icons along the bottom of touch screen 22. Each button icon emulates a button as might be found on a thermostat lacking a touch screen. The button icons include a SCHED icon 96, a HOLD icon 98, a CLOCK icon 100, a SCREEN icon 102 and a MORE button 104. SCHED icon 96 will be discussed in greater detail below.

HOLD icon 98 can be selected by the user if it is desired to override any existing programming and instead hold HVAC equipment 14 at a particular temperature without cycling through any time periods that may otherwise be programmed into program 40 (FIG. 1). For example, if a user is home for the day, he or she can use HOLD icon 98 to maintain the temperature setting of the WAKE period throughout the day, rather than cycling through the customary LEAVE and RETURN periods.

Touch screen 22 also displays a temperature value 106 that provides the user with the present temperature within their environment, as well as a temperature setting 108. Temperature setting 108 displays the temperature set point that HVAC controller 10 is presently following. Touch screen 22 includes a text message 110, which informs the user that HVAC controller 10 is following its programmed schedule.

Temperature setting 108 can be used to set a temporary temperature set point using HOLD icon 98 described above. Touch screen 22 includes an UP icon 112 and a DOWN icon 114. The user can raise the temperature set point by selecting UP icon 112 and can reduce the temperature set point by selecting DOWN icon 114. In the illustrative embodiment, subsequently selecting the HOLD icon 98 will instruct HVAC controller 10 to maintain the temporary temperature set point. In some embodiments, HVAC controller 10 can ask the user to specify a time period to maintain the temporary temperature set point, if desired.

HVAC controller 10 includes software code or circuitry that functions as a clock, in order to accurately maintain program 40. CLOCK icon 100 can be used to set or adjust the time held by HVAC controller 10. Upon initial installation and setup of HVAC controller 10, it may be necessary to enter or update the time setting. In some embodiments, it may be necessary to change the time setting to accommodate entering or departing Daylight Savings Time (DST). In other embodiments, HVAC controller 10 can automatically adapt to Daylight Savings Time. In some embodiments, HVAC controller 10 can be in radio communication with a standard time reference source, if desired.

Touch screen 22 can display the present time at TIME icon 116. As illustrated, the time is displayed using a 12 hour clock, with an AM or PM notation. In some embodiments, the time can be displayed using a 24 hour military clock, if desired.

Touch screen 22 also includes a SCREEN icon 104 that can be used to temporarily disable touch screen 22 from accepting any user inputs so that the surface of touch screen 22 can be wiped off or otherwise cleaned. MORE icon 106 permits a user to access additional features of HVAC controller 10, such as scheduling reminders for filter replacement, setting operational parameters for a UV lamp, and the like. In some embodiments, touch screen 22 can include an OUTDOOR icon 118 that displays the outside ambient temperature.

FIG. 9 illustrates a step-by-step process for modifying a number of parameters 38 (see FIG. 1) in accordance with an illustrative embodiment of the present invention. Prior to beginning an editing process, the thermostat 90 can appear as shown in FIG. 10. With reference to FIG. 9, a user can initiate an edit mode, as indicated at block 120. In some embodiments, the edit mode can be reached by selecting the SCHED icon 96 (FIG. 10). As a result, touch screen 22 may display the edit mode as illustrated in FIG. 11 and as indicated at block 122 of FIG. 9.

Figure 11:
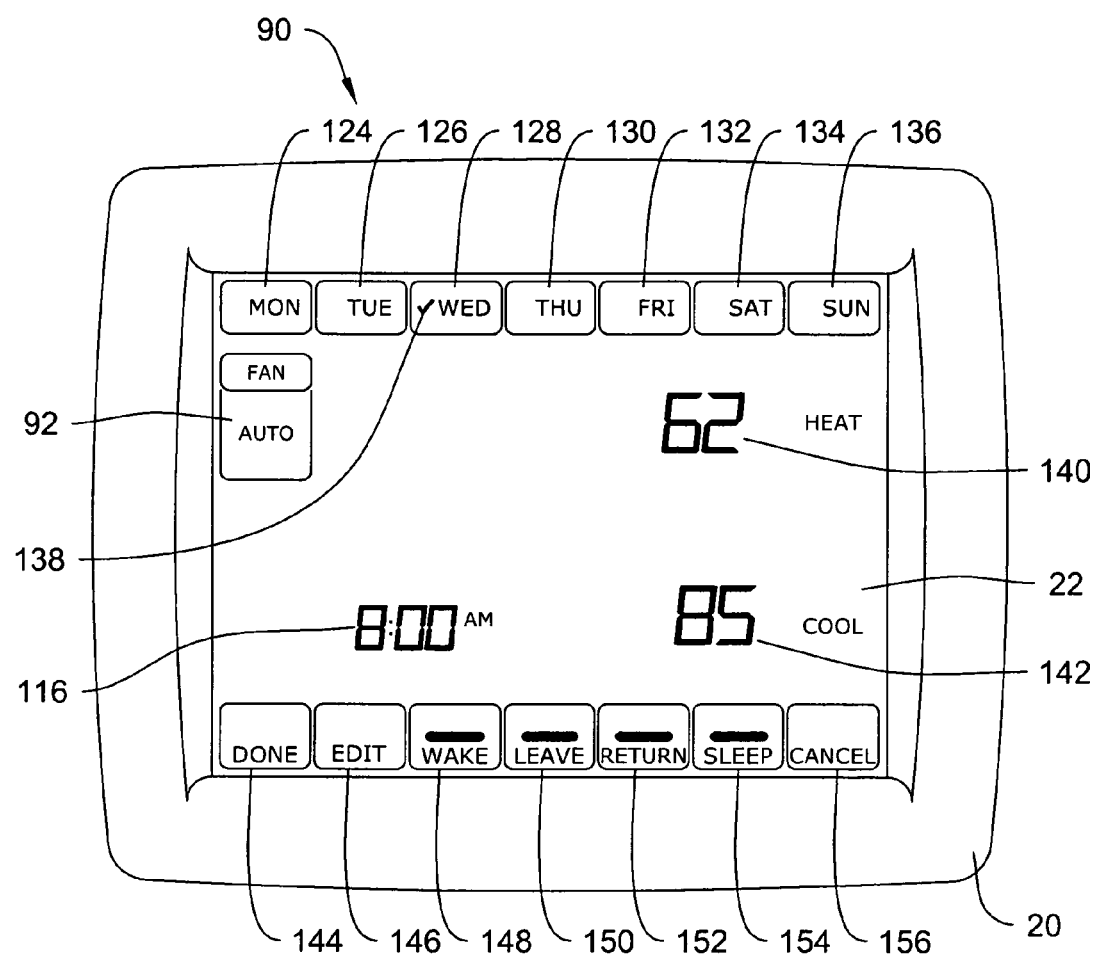

FIG. 11 shows thermostat 90 in an initial edit mode. Initially, touch screen 22 displays the current temperature set points as well as the present day of the week and the present time. The days of the week are shown across the top of touch screen 22, and are referenced as MON icon 124, TUE icon 126, WED icon 128, THU icon 130, FRI icon 132, SAT icon 134 and SUN icon 136. As illustrated, the present day of the week is Wednesday, as indicated by the checkmark 138 present on WED icon 128. In other embodiments, the present day of the week may be presented in other ways, such as having WED icon 128 blink, or be displayed in bold, or as a different color or shade.

Touch screen 22 displays a HEAT icon 140 that indicates the temperature set point for heating operations and a COOL icon 142 that indicates the temperature set point for cooling operations. HVAC controller 10 (see FIG. 1) can instruct HVAC equipment 14 (see FIG. 1) to heat or cool as appropriate, in accordance with the input given to HVAC controller via SYSTEM icon 94 (FIG. 10).

In FIG. 11, touch screen 22 includes several button icons across the bottom of touch screen 22. In the illustrated embodiment, these button icons include a DONE icon 144, an EDIT icon 146, a WAKE icon 148, a LEAVE icon 150, a RETURN icon 152, a SLEEP icon 154, and a CANCEL icon 156. Each of the icons will be described in greater detail below. CANCEL icon 156 permits the user to cancel any entered changes.

Figure 12:
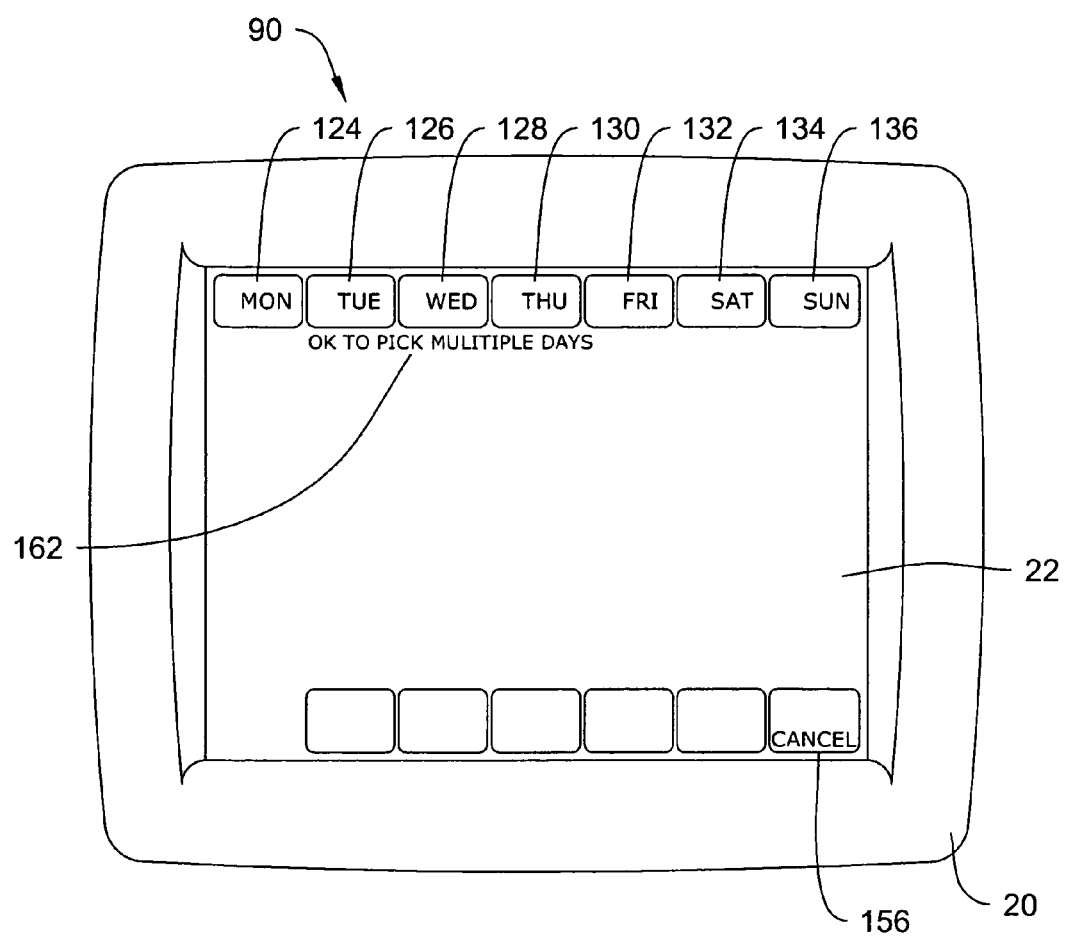

With reference to FIG. 9, a user can select which days of the week he or she wish to edit, as indicated at block 158. Control passes to display block 160, which corresponds to the thermostat 90 as illustrated in FIG. 12. In FIG. 12, the MON icon 124, TUE icon 126, WED icon 128, THU icon 130, FRI icon 132, SAT icon 134 and SUN icon 136 are each displayed, along with a message icon 162 that informs the user that multiple days can be selected. The particular message being displayed by message icon 162 can be any appropriate message and is not limited to the illustrated message.

Figure 13:
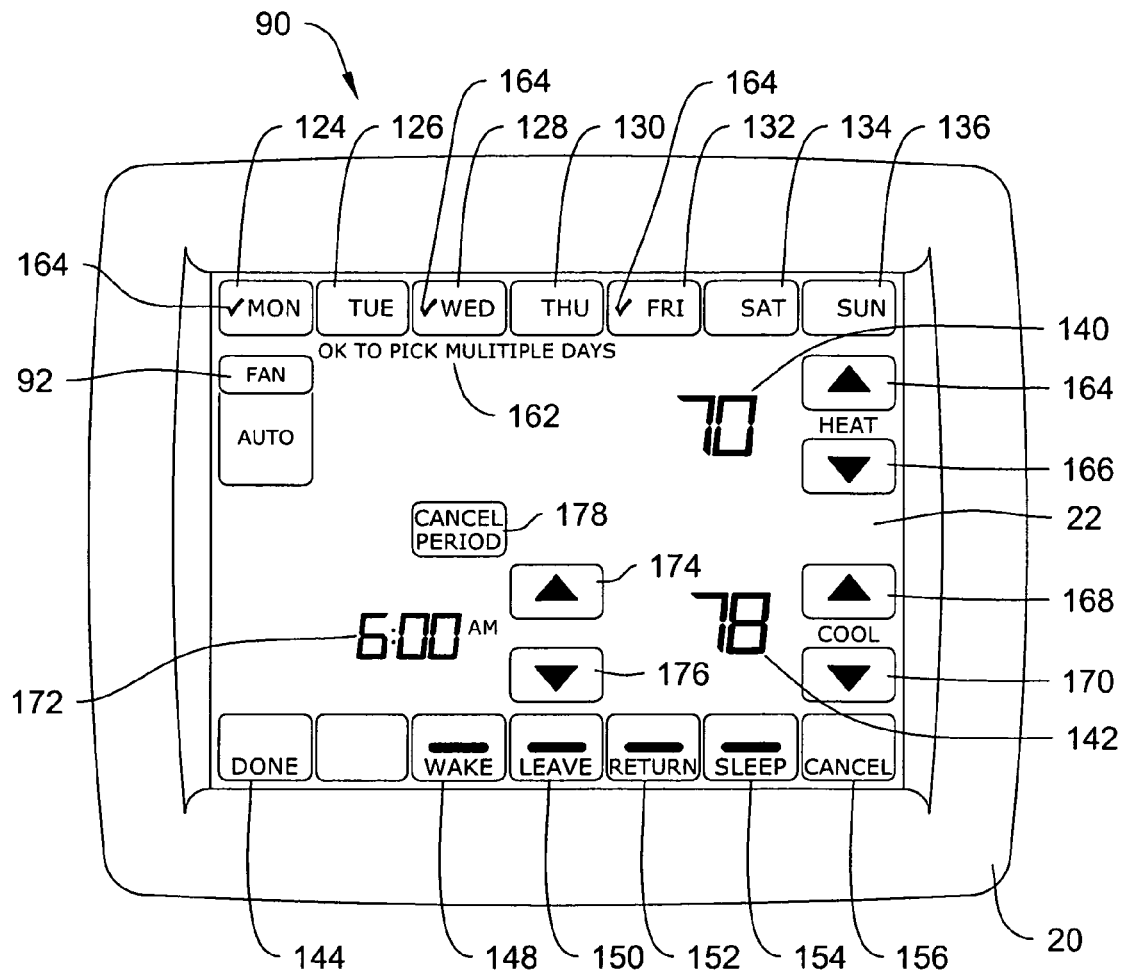

In the illustrative embodiment, the user can select one or more days to edit by simply touching touch screen 22 proximate the appropriate days of the week icons. In the process of selecting the one or more days to edit, touch screen 22 can provide a display as illustrated in FIG. 13. In the illustrated embodiment, the user has selected Monday, Wednesday and Friday for editing, as noted by checkmark 164 present on each of MON icon 124, WED icon 128, and FRI icon 132. In some embodiments, the user will recognize that he or she is in the edit mode, as EDIT icon 146 (as seen in FIG. 11) will be blanked or grayed out (as seen in FIG. 13), and also by the presence of the UP button 112 and DOWN button 114, as well as the absence of an EDIT button.

At this point, the user is in a position to select a time period for modification, followed by modifying one or more of the start time, heating temperature set point and cooling temperature set point for the selected time period. Touch screen 22 displays HEAT icon 140, which displays the heating temperature set point, as well as UP icon 164 and DOWN icon 166. UP icon 164 and DOWN icon 166 can be used to raise or lower the heating temperature set point displayed by HEAT icon 140. Similarly, touch screen 22 displays COOL icon 142, which displays the cooling temperature set point. UP icon 168 and DOWN icon 170 can be used by the user to raise or lower the cooling temperature set point displayed by COOL icon 142.

Touch screen 22 displays TIME SET POINT icon 172, which can be used to display the starting point of any selected time period. As with TIME icon 116 that displays current time, TIME SET POINT icon 172 can display time either using a 12 hour clock and an AM/PM designation, or a 24 hour military style clock. The starting time for any selected time period can be adjusted up or down using UP icon 174 and DOWN icon 176. In some embodiments, touch screen 22 can display a CANCEL PERIOD icon 178, which enables a user to switch to editing a different time period.

Figure 14:
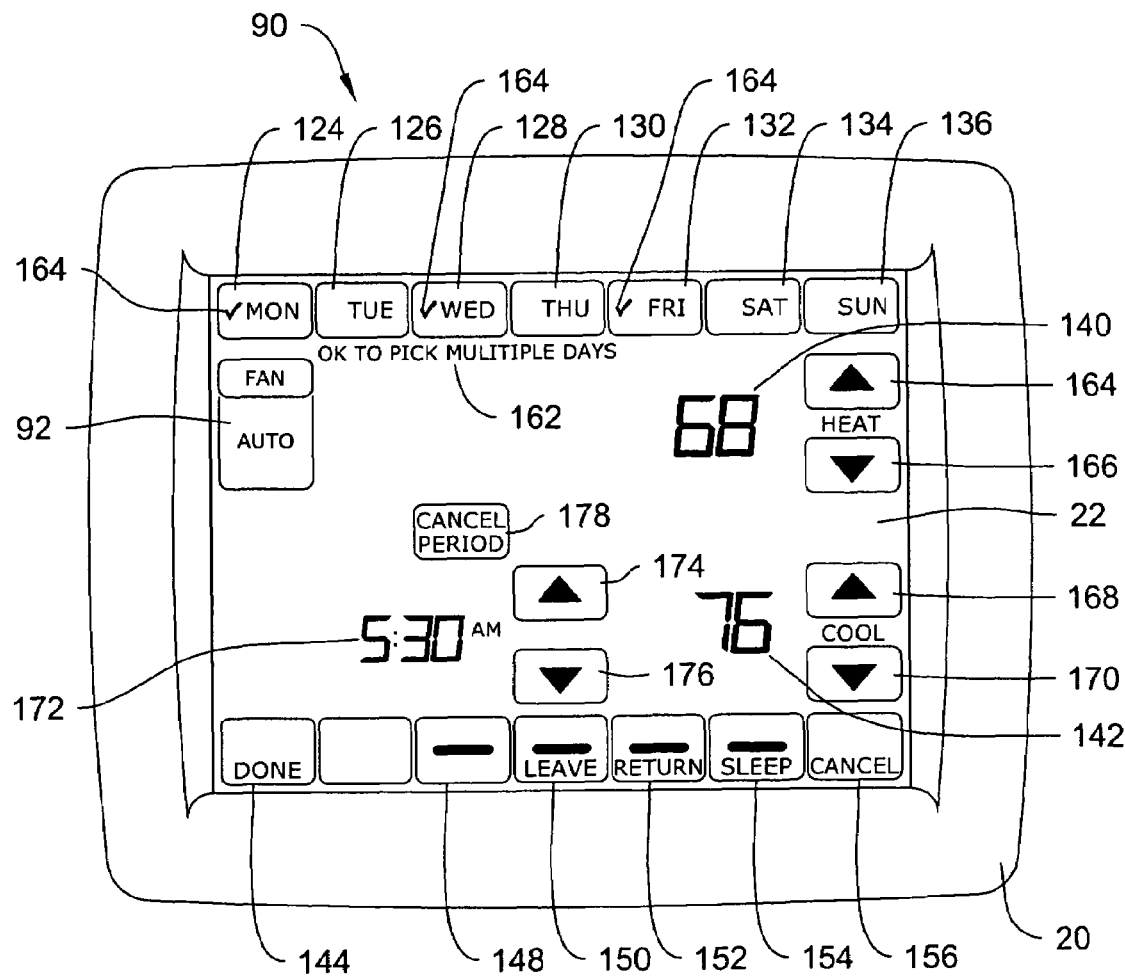

For illustrative purposes and with reference to FIG. 9, the user can then select the WAKE period for editing at block 180. As illustrated in FIG. 14, the user has elected to modify one or more of the start time, the heating set point and the cooling set point for the WAKE period. In the illustration, the user has set the starting time for the WAKE period at 5:30 AM by appropriately touching UP icon 174 and DOWN icon 176. The heating set point temperature has been adjusted to 68° F. by appropriately touching UP icon 164 and DOWN icon 166 while the cooling set point temperature has been adjusted to 76° F. by appropriately touching UP icon 168 and DOWN icon 170. As illustrated, temperatures are shown in degrees Fahrenheit, but degrees Celsius can also be used. Each of the starting time, heating set point temperature and cooling set point temperature, whether modified or not, are displayed by TIME SET POINT icon 172, HEAT icon 140 and COOL icon 142, respectively, as outlined at block 182 of FIG. 9.

In some embodiments, the icon representing the selected time period can be modified to remind the user which time period has been selected. In particular embodiments, the text present on the icon can blink. As shown in FIG. 14, WAKE icon 148 is blinking, hence the (temporary) absence of the word "WAKE" on WAKE icon 148. In other embodiments, the entire WAKE icon 148 could blink, be bolded, be presented in a different color or shading pattern, or be designated in any other suitable way. In other embodiments, each of the non-selected time periods could be grayed or blanked out.

Figure 15:
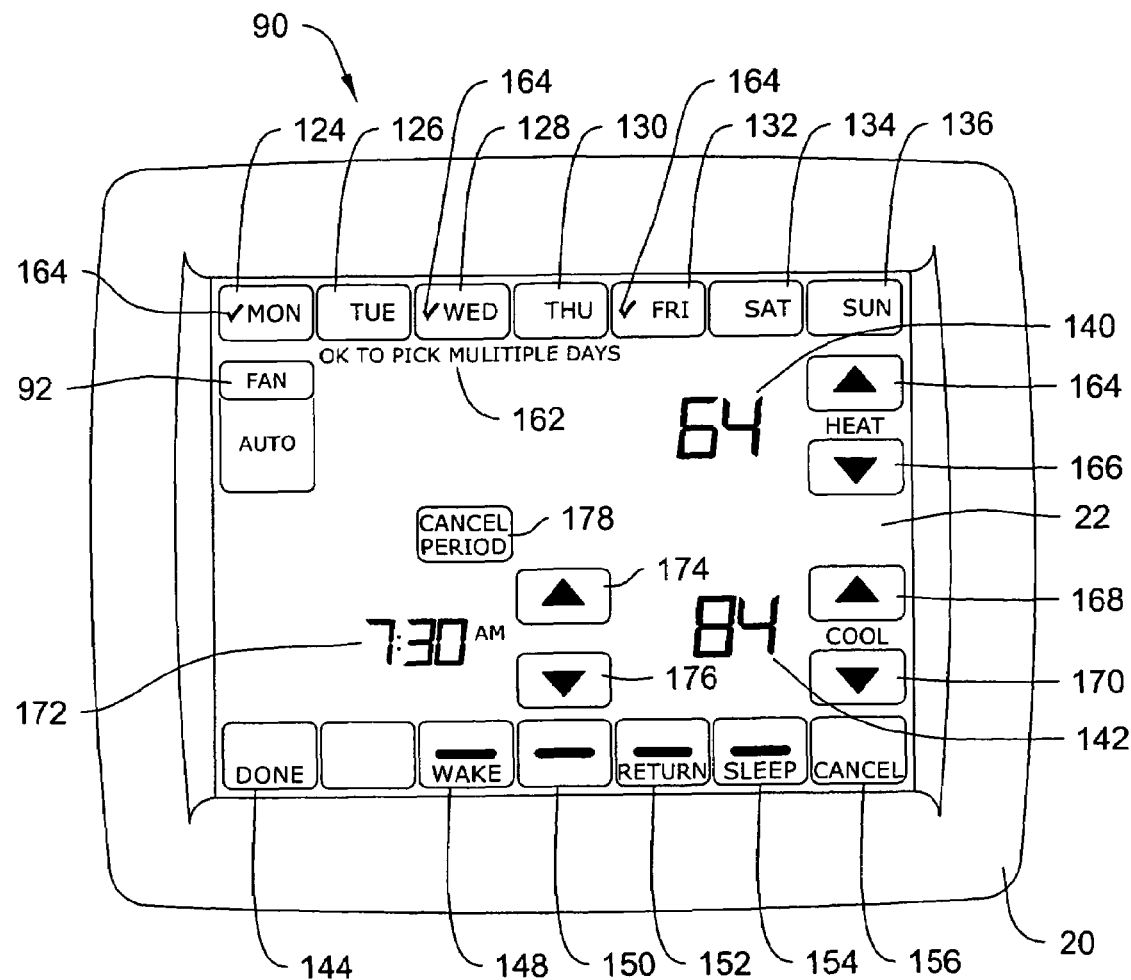

The user can select another time period for modification. In the illustrated example, as shown in FIG. 15 and as indicated at block 184 (FIG. 9), the user has elected to modify the LEAVE time period. This can be indicated, as seen in FIG. 15, by having the word "LEAVE" blink on LEAVE icon 150.

In the illustration, the user has set the starting time for the LEAVE period at 7:30 AM by appropriately touching UP icon 174 and DOWN icon 176. The heating set point temperature has been adjusted to 64° F. by appropriately touching UP icon 164 and DOWN icon 166 while the cooling set point temperature has been adjusted to 84° F. by appropriately touching UP icon 168 and DOWN icon 170. Each of the starting time, heating set point temperature and cooling set point temperature, whether modified or not, may be displayed by TIME SET POINT icon 172, HEAT icon 140 and COOL icon 142, respectively, as outlined at block 186 of FIG. 9.

Figure 16:
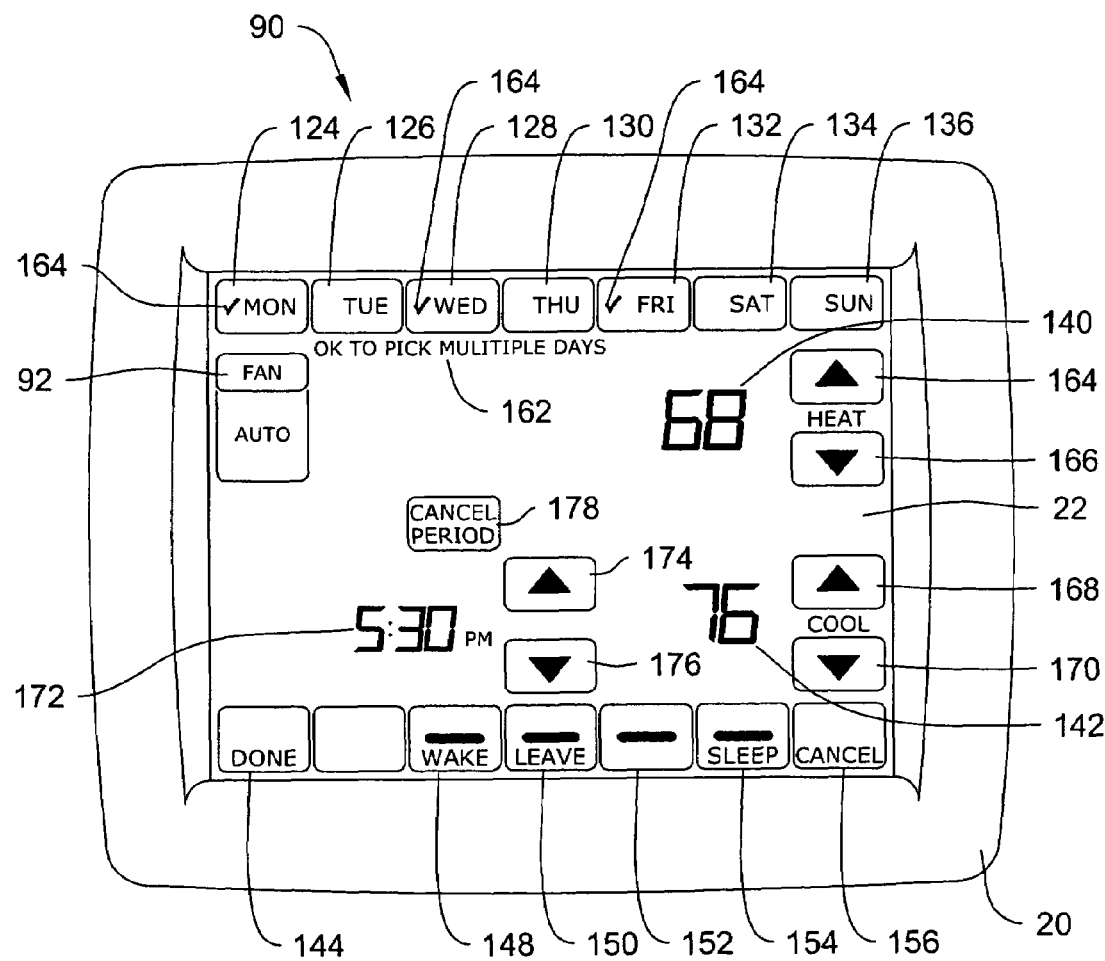

The user can select another time period for modification. In the illustrated example, as shown in FIG. 16 and as indicated at block 188 (FIG. 9), the user has elected to modify the RETURN time period. This can be indicated, as seen in FIG. 16, by having the word "RETURN" blink on RETURN icon 152.

In the illustration, the user has set the starting time for the RETURN period at 5:30 PM by appropriately touching UP icon 174 and DOWN icon 176. The heating set point temperature has been adjusted to 68° F. by appropriately touching UP icon 164 and DOWN icon 166 while the cooling set point temperature has been adjusted to 76° F. by appropriately touching UP icon 168 and DOWN icon 170. Each of the starting time, heating set point temperature and cooling set point temperature, whether modified or not, may be displayed by TIME SET POINT icon 172, HEAT icon 140 and COOL icon 142, respectively, as indicated at block 190 of FIG. 9.

Figure 17:
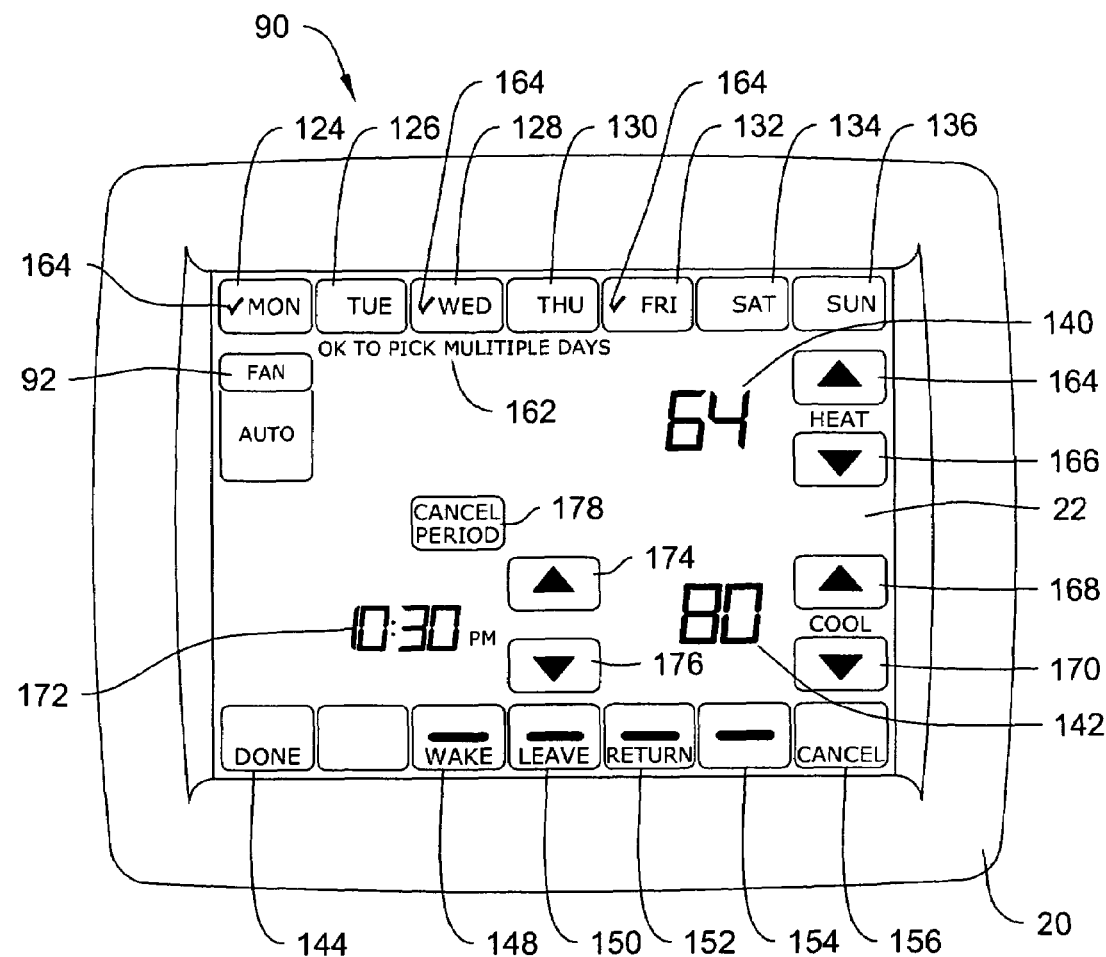

The user can select another time period for modification. In the illustrated example, as shown in FIG. 17 and as indicated at block 192 (FIG. 9), the user has elected to modify the SLEEP time period. This can be indicated, as seen in FIG. 17, by having the word "SLEEP" blink on SLEEP icon 154.

In the illustration, the user has set the starting time for the SLEEP period at 10:30 PM by appropriately touching UP icon 174 and DOWN icon 176. The heating set point temperature has been adjusted to 64° F. by appropriately touching UP icon 164 and DOWN icon 166 while the cooling set point temperature has been adjusted to 80° F. by appropriately touching UP icon 168 and DOWN icon 170. Each of the starting time, heating set point temperature and cooling set point temperature, whether modified or not, may be displayed by TIME SET POINT icon 172, HEAT icon 140 and COOL icon 142, respectively, as indicated at block 194 of FIG. 9.

Figure 18:
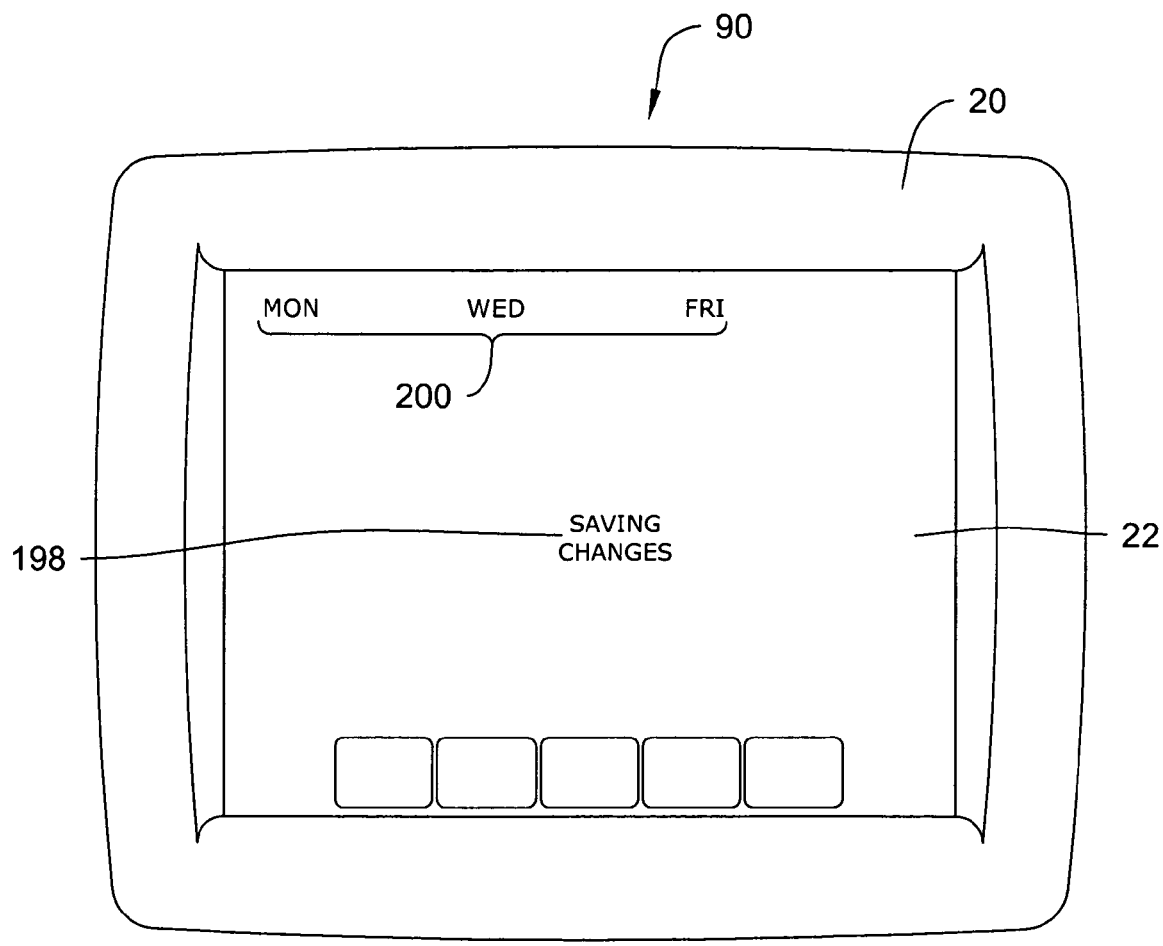

Once the user has completed modifying each of the desired time periods, he or she can indicate that they are done by touching DONE icon 144 (FIG. 17). Control may then be passed to block 196 (FIG. 9). As illustrated in FIG. 18, HVAC controller 10 provides the user with confirmation that the changes are or will be saved. The modified parameters are also saved to memory, as shown at block 197. In some embodiments, the confirmation can be provided prior to actually saving the changes to memory. In other embodiments, the confirmation can be provided simultaneously with or after the changes are actually saved. The confirmation message can be aural or visual, as desired. As shown in FIG. 18, and in the illustrative embodiment, the confirmation message can be a text message such as "SAVING CHANGES", as displayed by CONFIRMATION MESSAGE icon 198. In other embodiments, the confirmation message may be a graphical message or icon, or any other suitable indicator that indicates to the user that the changes have been or will be saved.

In some embodiments, as illustrated for example in FIG. 18, some of the display icons not necessary to a particular task can be completely removed, or can be grayed or blacked out. As shown, a number of icons have been completely removed while other icons, such as the time period icons, are blanked out or are presented in outline form only. A number of display permutations are permissible within the invention.

The confirmation message can be presented by CONFIRMATION MESSAGE icon 198 alone. In some embodiments, one or more of the modified parameters can be displayed along with CONFIRMATION MESSAGE icon 198. For example, touch screen 22 can display MODIFIED PARAMETER icon 200. As illustrated, MODIFIED PARAMETER icon 200 displays the particular days of the week that were modified by the user. In other embodiments, MODIFIED PARAMETER icon 200 can display one or more of the modified parameters such as time and temperature set points, if desired.

Once the confirmation message has been displayed for an appropriate period of time, thermostat 90 can return to normal operation, as referenced at block 197 of FIG. 9. In some illustrative embodiments, the confirmation message can be displayed for a period of at least 1 second, at least 5 seconds, at least 10 seconds, or any other suitable time period, as desired.

FIGS. 9–18 illustrated a particular illustrative embodiment in which thermostat 90 included touch screen 22, which was used for the interaction between thermostat 90 and the user. In other embodiments, as illustrated in FIGS. 19–27, a thermostat having a display and one or more key buttons can be used.

Figure 19:
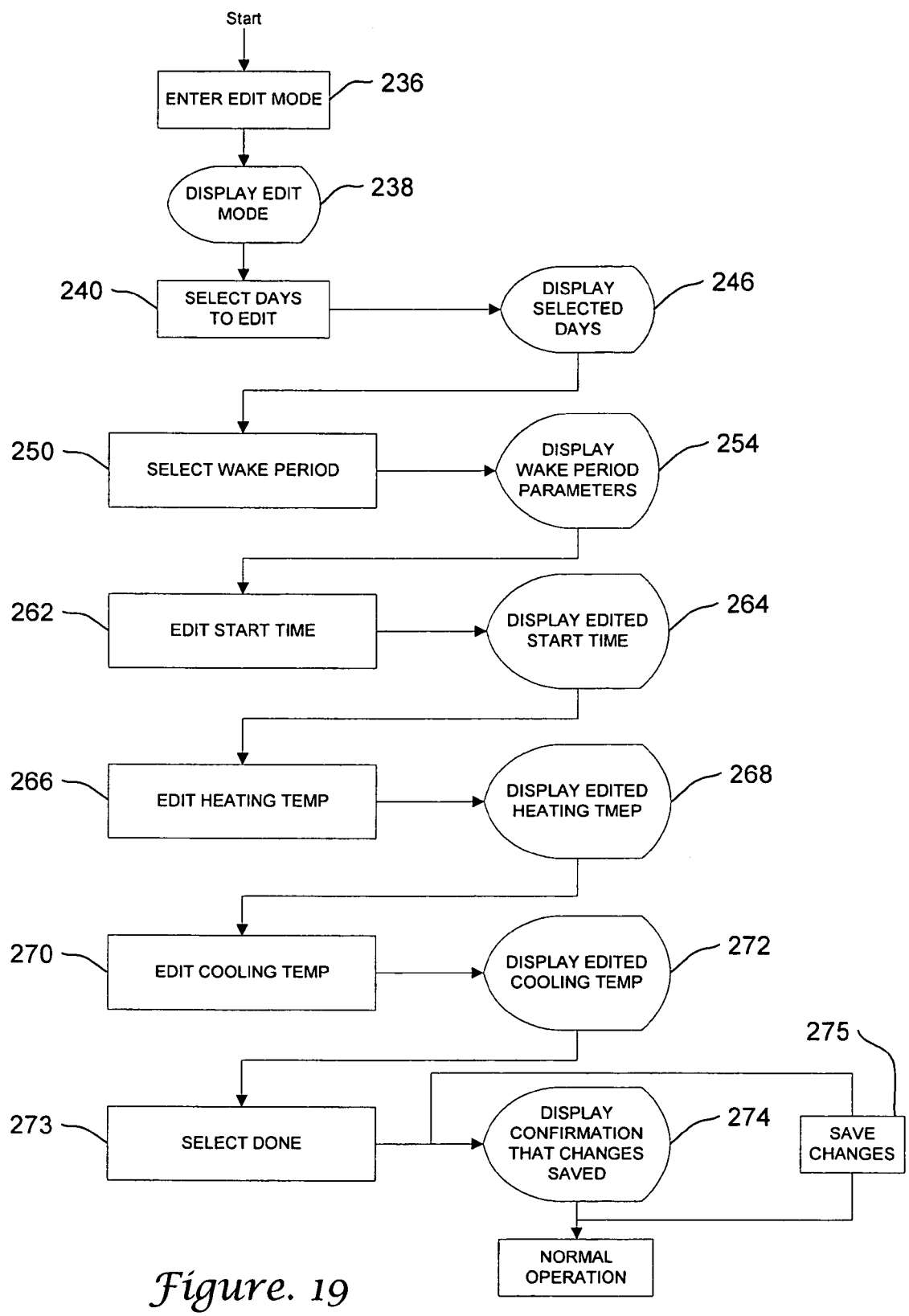
FIG. 19 is a flow diagram showing yet another illustrative HVAC method that may be implemented by the programmable controller of FIG. 1.

FIG. 19 is a flowchart illustrating an illustrative step-by-step process of updating one or more parameters in accordance with another embodiment of the invention. FIGS. 20–27 are non-limiting schematic illustrations of an HVAC controller configured as a residential or commercial thermostat, demonstrating the process steps outlined in FIG. 19. It should be noted that FIGS. 20–27 illustrate an HVAC controller having particular icons and buttons displayed in particular locations. It is important to note that these positions are merely illustrative and are not intended to be limiting in any manner or fashion.

Figure 20:
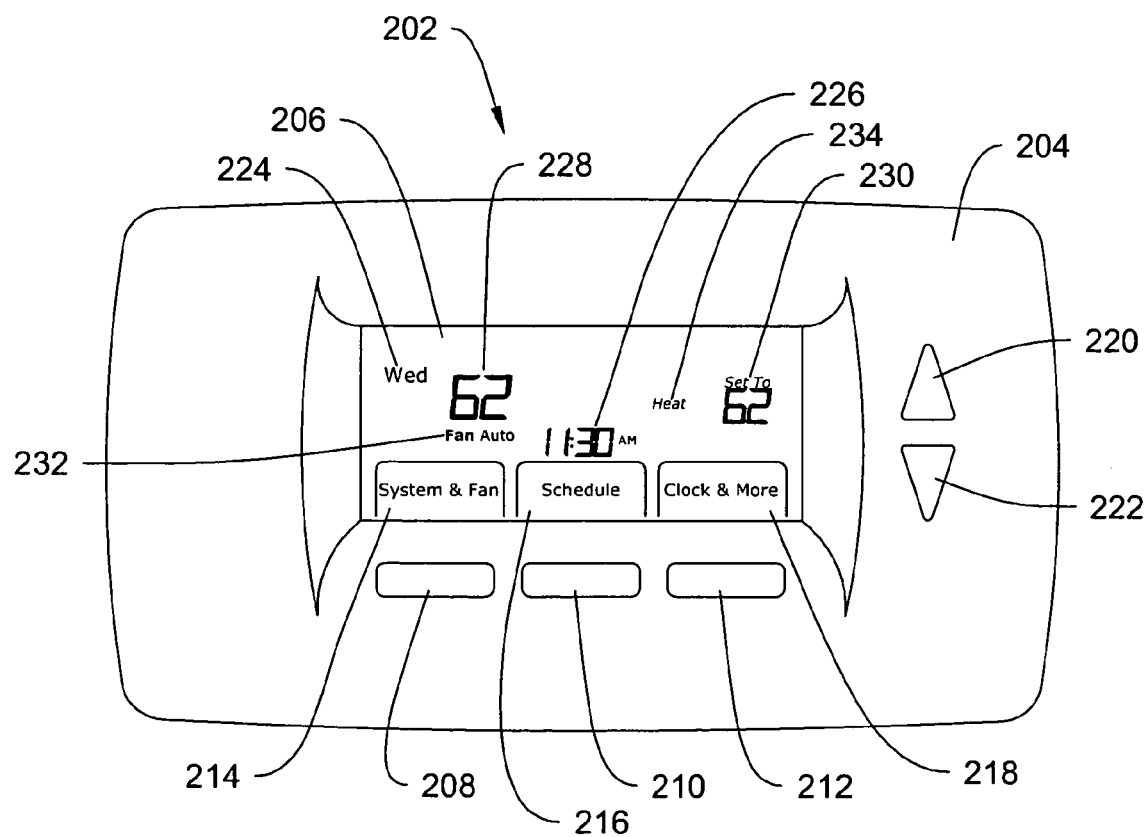
FIGS. 20–27 are schematic drawings of an HVAC controller, corresponding to the illustrative method of FIG. 19.
Figure 21:
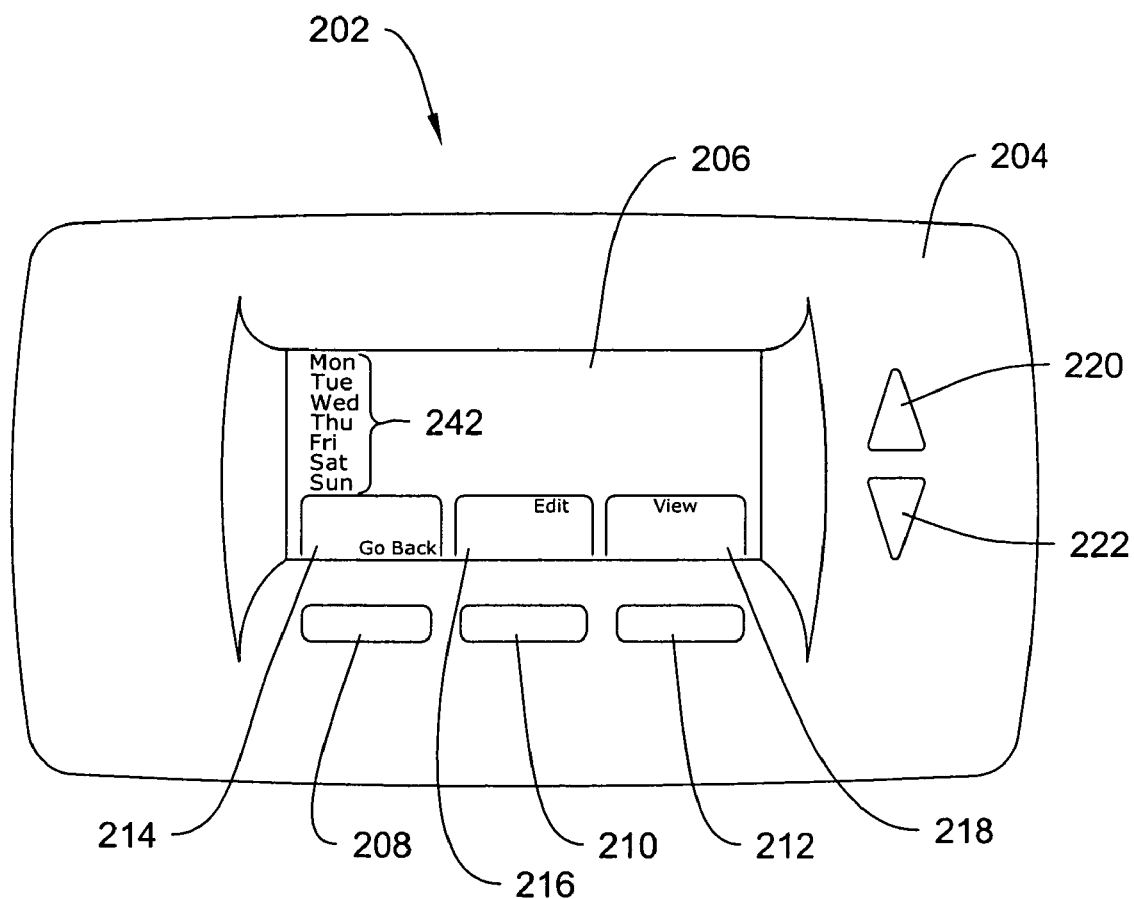

FIG. 20 displays a thermostat 202 having a housing 204 and a display 206. Display 206 can be any suitable display such as an LED display, an LCD display, or any other suitable display. Thermostat 202 includes a button 208, a button 210 and a button 212 that can be assigned to various parameters or functions, depending on, for example, whether thermostat 202 is in an operating mode or an editing mode. Display 206 includes a BUTTON 208 icon 214 corresponding to the assigned use of button 208, a BUTTON 210 icon 216 corresponding to the assigned use of button 210 and a BUTTON 212 icon 218 corresponding to the assigned use of button 212. UP button 220 and DOWN button 222 can be used to adjust the value of a parameter up or down as appropriate.

FIG. 20 illustrates thermostat 202 in an editing mode. As a result, button 208 is assigned to SYSTEM AND FAN (as indicated by BUTTON 208 icon), button 210 is assigned to SCHEDULE (as indicated by BUTTON 210 icon), and button 212 is assigned to CLOCK AND MORE (as indicated by BUTTON 212 icon). Button 208, which is assigned to SYSTEM AND FAN, can be used to permit a user to select from a variety of fan and heating options. For example, the user can scroll through fan ON, fan AUTO and fan CIRC, which will cause HVAC equipment 14 to run a fan continuously, only when the system is actively heating or cooling, or on a predetermined schedule, respectively. The user can also scroll through options such as emergency HEAT, HEAT, or COOL.

Button 210, which is assigned to SCHEDULE, can be used for modifying one or more of the parameters governing program 40 (FIG. 1), as will be described in greater detail below. Button 212, which is assigned to CLOCK AND MORE, can be used for modifying time settings, maintenance issues and the like.

Display 206 includes a DAY icon 224 that indicates the current day of the week, and a TIME icon 226 that indicates the current time. TEMPERATURE icon 228 indicates the current temperature while TEMPERATURE SET POINT icon 230 indicates the current temperature set point. As illustrated, it is 11:30 AM on Wednesday, and the current temperature and temperature set point are both 62° F. Display 206 includes a FAN icon 232 that indicates fan status and a SYSTEM icon 234 that indicates system status. As illustrated, the fan is on auto and the system is in heating mode.

Turning now to FIG. 19, a user can enter the edit mode as outlined at block 236 by hitting button 210, which as indicated in FIG. 20 is presently assigned (as indicated by BUTTON 210 icon) to SCHEDULE. Thermostat 202 enters and displays an edit mode, as referenced at display block 238 of FIG. 19, which produces the screen shown in FIG. 21. In edit mode, button 208 is assigned to GO BACK, button 210 is assigned to EDIT, and button 212 is assigned to VIEW, as illustrated by BUTTON 208 icon, BUTTON 210 icon, and BUTTON 212 icon, respectively.

In the edit mode, the user is able to select one or more days for editing, as referenced by block 240 of FIG. 19. Display 206 displays LIST OF DAYS 242. By a combination of button 210 (assigned to EDIT), UP button 220 and DOWN button 222, one or more days can be selected for editing. When a particular day is highlighted in LIST OF DAYS 242, hitting button 212 (assigned to VIEW) causes thermostat 202 to display the time and temperatures set points for that particular day. GO BACK refers to back tracking to a previous step.

Figure 22:
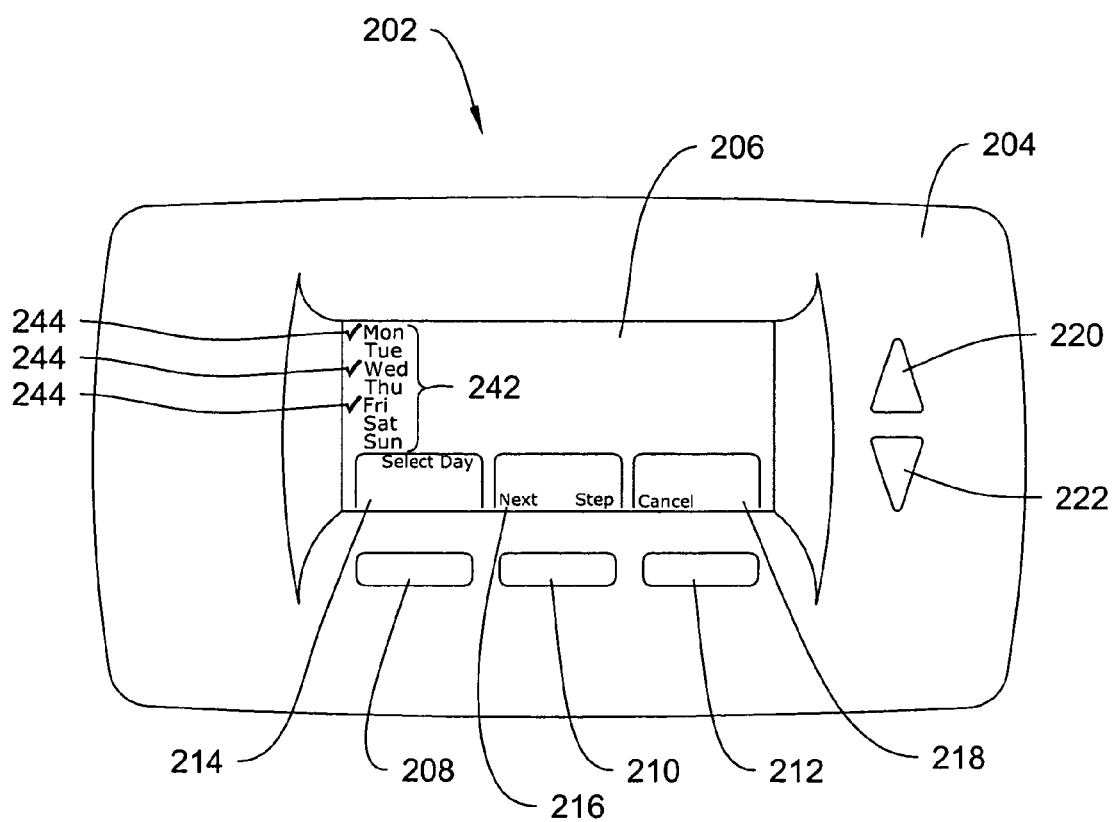

During the process of selecting days to edit from LIST OF DAYS 242, button 208 is assigned to SELECT DAY, button 210 is assigned to NEXT STEP and button 212 is assigned to CANCEL, as evidenced by BUTTON 208 icon, BUTTON 210 icon, and BUTTON 212 icon, respectively, of FIG. 22.

In the illustrated embodiment shown in FIG. 22, Monday, Wednesday and Friday have been selected for editing, and as referenced at block 246 of FIG. 19. In particular, LIST OF DAYS 242 includes checkmarks 244 next to each of Monday, Wednesday and Friday. In other embodiments, the selected days can be indicated in any number of ways, such as having the selected days blink, be bolded, be presented in a different color, shading, or font, or by using any other suitable designation.

Figure 23:
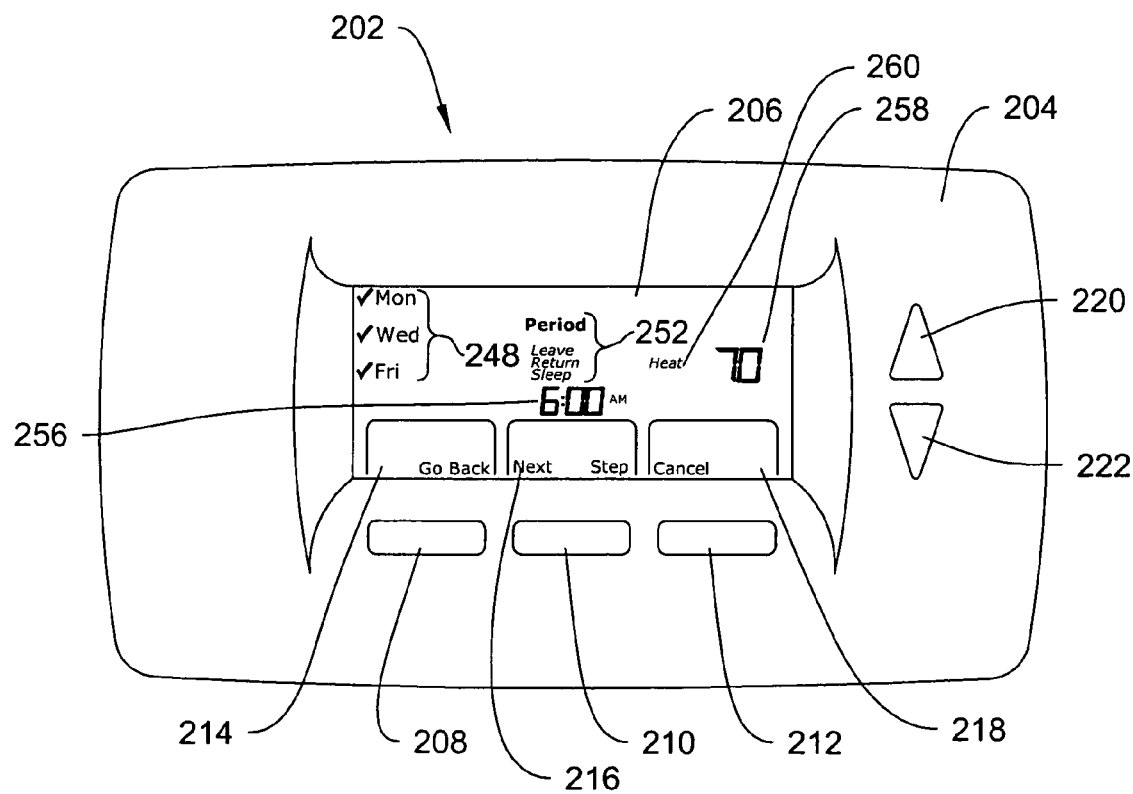

Once the days have been selected, the user can proceed to the next step by hitting button 210. FIG. 23 illustrates thermostat 202 ready for the user to select a particular time period for editing. In some embodiments, as illustrated in FIG. 23, thermostat 202 defaults to initially editing the WAKE period as referenced at block 250 of FIG. 19.

Display 206 now displays SELECTED DAYS icon 248, which shows which days were selected and are now being edited. As illustrated, the non-selected days are removed from the display and a checkmark accompanies each selected day. In other embodiments, each of the days of the week can be displayed, with the selected days being bolded, blinking, or presented in a different color, shading or font, or by using any other suitable designation.

Display 206 of FIG. 23 includes TIME PERIOD icon 252, which provides an indication to the user of which time period has been selected for editing. As illustrated, the selected "Wake" time period can be blinking, as evidenced by the absence of the wake time period in FIG. 23. In other embodiments, the selected time period can be bolded or presented in a different color, shading or font, or by using any other suitable designation. In some embodiments, only the selected time period is presented, while the remaining time periods are blanked or grayed out.

With respect to FIG. 19, display 206 displays the initial WAKE period parameters prior to editing as referenced at block 254. Display 206 includes TIME icon 256 that displays the initial starting time for the WAKE period. Display 206 also includes TEMPERATURE icon 258 and SYSTEM icon 234. As illustrated, the WAKE period is scheduled to begin at 6:00 AM, and the temperature set point (in heating mode) is 70° F. At this point, hitting button 210 (assigned to NEXT STEP) permits the user to enter modifications to the WAKE period.

Figure 24:
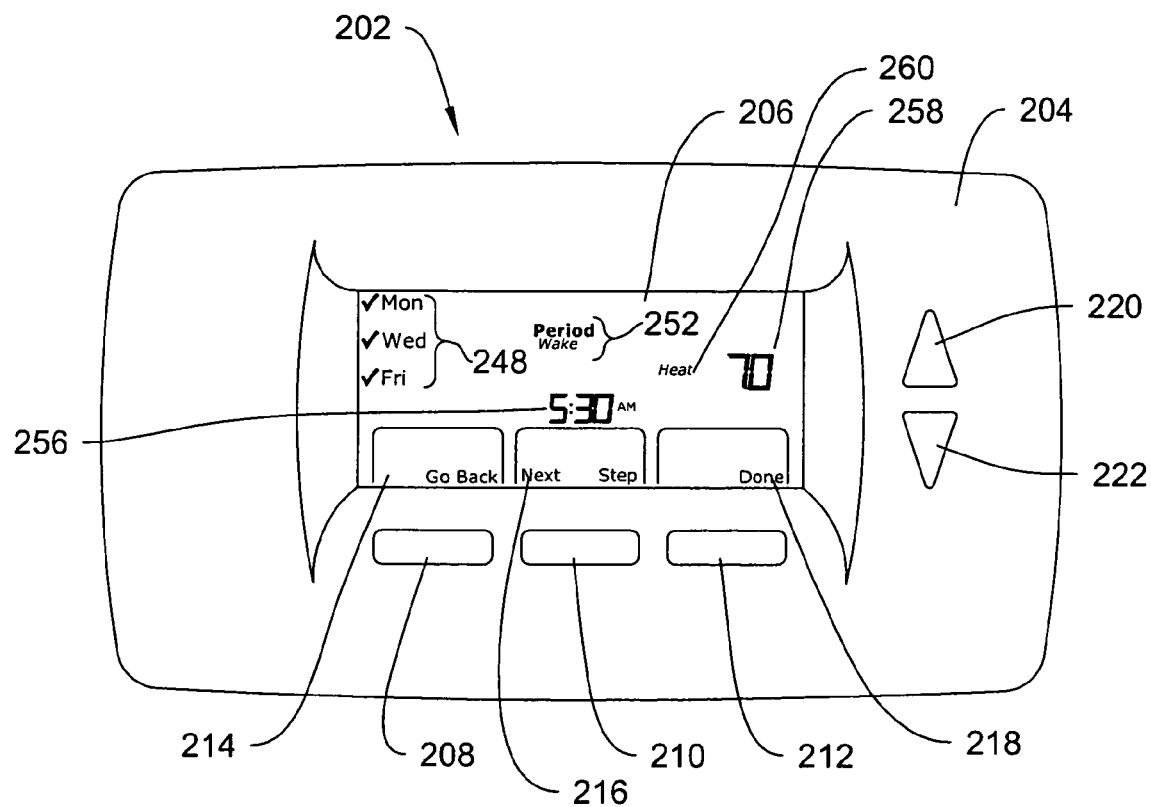

Block 262 of FIG. 19 references editing the start time of the WAKE period. FIG. 24 shows that the start time has been changed to 5:30 AM, by appropriately hitting UP button 220 and DOWN button 222. TIME icon 206 displays the new time setting, as referenced at block 264 of FIG. 19.

Figure 25:
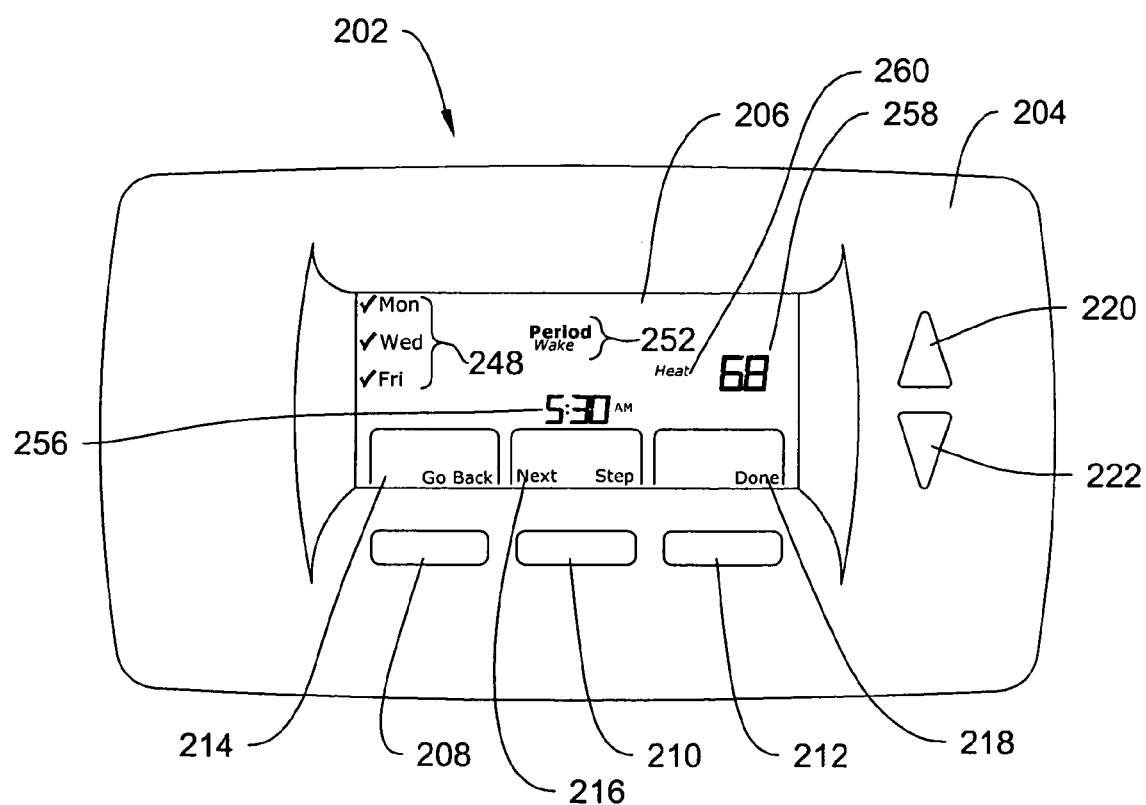

By hitting button 210, assigned to NEXT STEP as referenced by BUTTON icon 216, the user is able to next modify the heating temperature set point as referenced by block 266 of FIG. 19. As illustrated in FIG. 25, the heating temperature set point has been changed to 68° F. by appropriately hitting UP button 220 and DOWN button 222. TEMPERATURE icon 258 displays the new temperature setting, as referenced at block 268 of FIG. 19.

Figure 26:
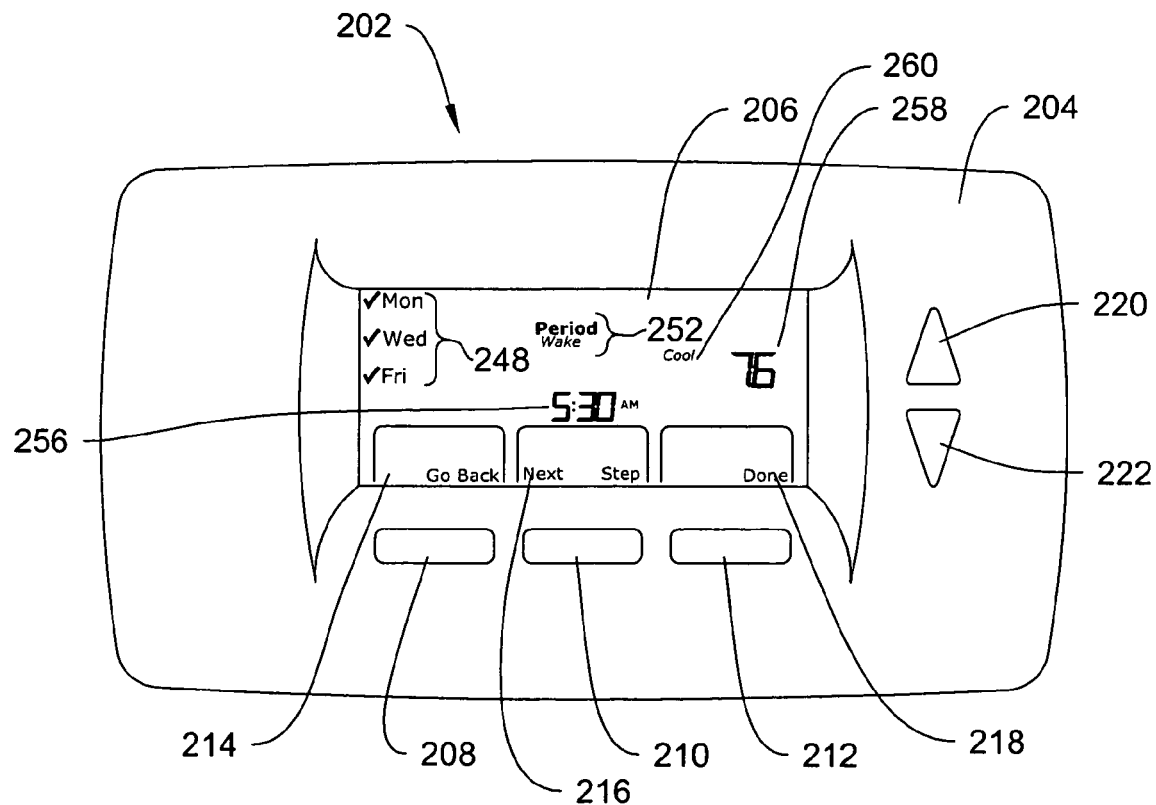

By hitting button 210, still assigned to NEXT STEP as referenced by BUTTON icon 216, the user is able to next modify the cooling temperature set point as referenced by block 270 of FIG. 19. As illustrated in FIG. 26, the cooling temperature set point has been changed to 76° F. by appropriately hitting UP button 220 and DOWN button 222. TEMPERATURE icon 258 displays the new temperature setting, as referenced at block 272 of FIG. 19.

After the user has finished modifying each of the time and temperature set points for the WAKE period, he or she can inform thermostat 202 that he or she is finished entering changes for that period. It should be noted that each of remaining time periods LEAVE, RETURN and SLEEP can be modified in much the same way, although not explicitly shown in the figures.

Figure 27:
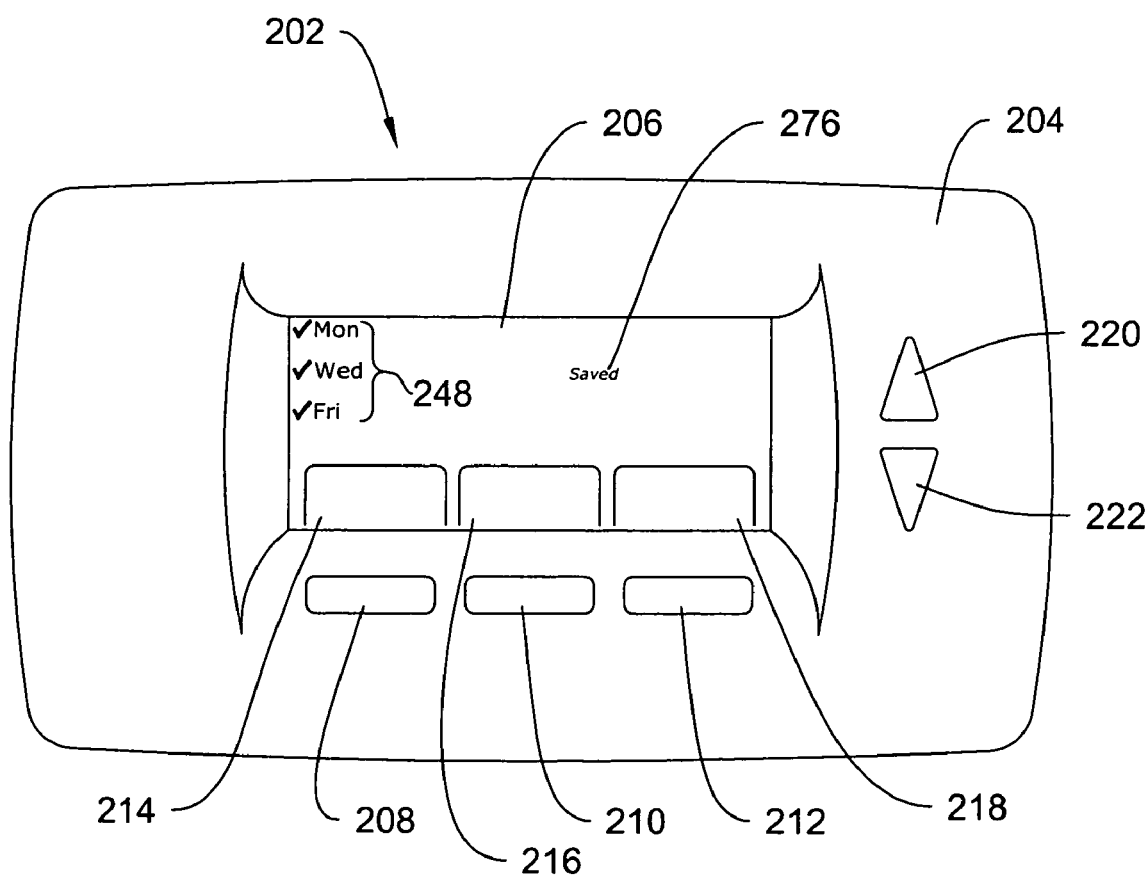

The step of notifying thermostat 202 that the user is done entering changes can in some embodiments be achieved by hitting button 212, which as indicated by BUTTON icon 216 is assigned to DONE. After hitting button 212, as referenced at block 273 of FIG. 19, control may be passed to display block 274. At display block 274, thermostat 202 may provide a confirmation message that the changes have been or will be saved, as illustrated in FIG. 27. The modified parameters are also saved to memory, as shown at block 275. In some embodiments, the changes can be saved prior to providing confirmation to the user. In other embodiments, the changes can be saved after or substantially simultaneously with providing confirmation to the user.

FIG. 27 shows that display 206 can include MESSAGE icon 276, which is configured to provide a message confirming that the changes have been or will be saved. In the illustrated embodiment, MESSAGE icon 276 provides a simple text message such as "SAVED". In other embodiments, MESSAGE icon 276 can provide other text messages, other visual indications, an aural confirmation message, or any other suitable confirmation message to the user. Once MESSAGE icon 276 has provided the confirmation message for an appropriate period of time, and in the illustrative embodiment, thermostat 202 can return to its customary operation at referenced at block 276 of FIG. 19.

In FIG. 27, many of the display icons not necessary to this step have been either completely removed or at least partially blanked out or grayed out. A variety of display permutations are contemplated, and thus the invention is not to be limited to the particular display characteristics shown.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method of modifying one or more parameters of a programmable HVAC controller, the HVAC controller having a user interface, the method comprising the steps of:
   accepting a first input from a user via the user interface to modify at least one of the one or more parameters, wherein the at least one of the one or more parameters includes a time setting, and wherein the time setting includes a start time for one or more of a wake period, a leave period, a return period, or a sleep period;
   accepting a second input from the user via the user interface that indicates to the HVAC controller that parameter modification is complete;
   after the second input is accepted, providing to the user via the user interface a visually perceptible word or phrase that explicitly indicates that the at least one modified parameter has been, is being or will be saved; and
   saving the at least one modified parameter.

2. The method of claim 1, wherein the user interface comprises an alpha numeric display.

3. The method of claim 1, wherein the user interface comprises a keypad.

4. The method of claim 1, wherein the user interface comprises a touch screen.

5. The method of claim 1, wherein the HVAC controller operates a heating schedule.

6. The method of claim 1, wherein the HVAC controller operates a cooling schedule.

7. The method of claim 1, wherein the HVAC controller operates a ventilating schedule.

8. The method of claim 1, further comprising an initial step of displaying a plurality of parameters and allowing the user to select one or more parameters for modification via the user interface.

9. The method of claim 8, wherein displaying the plurality of parameters comprises displaying the parameters on an alpha numeric display.

10. The method of claim 8, wherein the allowing step of allowing the user to select at least one of the parameters for modification comprises accepting an input via the user interface.

11. The method of claim 8, wherein the allowing step of allowing the user to select at least one of the parameters for modification comprises accepting an input from a touch screen or a keypad.

12. The method of claim 1, wherein the accepting step of accepting a second input from the user includes the user touching a button of the user interface.

13. The method of claim 1, wherein the accepting step of accepting the first input from the user includes the user touching one or more buttons of the user interface in a sequence to modify at least one of the one or more parameters.

14. The method of claim 1, wherein another of the one or more parameters comprises a temperature setpoint.

15. The method of claim 1, wherein another of the one or more parameters comprises a humidity setpoint.

16. The method of claim 1, wherein at least selected ones of the one or more parameters comprises in combination a time setting and a temperature setting.

17. The method of claim 1, wherein the providing step of providing the visually perceptible word or phrase to the user via the user interface that the at least one modified parameter has been, is being, or will be saved comprises providing the visually perceptible word or phrase after the at least one modified parameter has been saved.

18. The method of claim 1, wherein the visually perceptible word or phrase comprises a text message on an alpha numeric display or a touch screen.

19. The method of claim 1, wherein the visually perceptible word or phrase comprises a graphical message or icon on a graphical display.

20. The method of claim 1, wherein at least one of the modified parameters is displayed in combination with the word or phrase.

21. The method of claim 1, wherein the providing step of providing the visually perceptible word or phrase to the user via the user interface that the one or more modified parameters has been, is being, or will be saved comprises displaying in combination the word or phrase and at least one of the modified parameters.

22. A method of modifying one or more parameters of a programmable HVAC controller, the HVAC controller having a user interface, the method comprising the steps of:
   accepting a first input from a user via the user interface to modify at least one of the one or more parameters, wherein the at least one of the one or more parameters includes a day setting;
   accepting a second input from the user via the user interface that indicates to the HVAC controller that parameter modification is complete;
   after the second input is accepted, providing to the user via the user interface a visually perceptible word or phrase that explicitly indicates that the at least one modified parameter has been, is being or will be saved; and
   saving the at least one modified parameter.

23. The method of claim 22, wherein the day setting is displayed in combination with the word or phrase.

24. A method of modifying one or more parameters of a programmable HVAC controller, the HVAC controller having a user interface, the method comprising the steps of:
   accepting a first input from a user via the user interface to modify at least one of the one or more parameters, wherein at least selected ones of the one or more parameters comprises in combination a time setting and a fan setting;

accepting a second input from the user via the user interface that indicates to the HVAC controller that parameter modification is complete;

after the second input is accepted, providing to the user via the user interface a visually perceptible word or phrase that explicitly indicates that the at least one modified parameter has been, is being or will be saved; and saving the at least one modified parameter.

25. A method of modifying one or more parameters of a programmable HVAC controller, the HVAC controller having a user interface, the method comprising the steps of:

accepting a first input from a user via the user interface to modify at least one of the one or more parameters, wherein at least selected ones of the one or more parameters comprises in combination a time setting and an equipment selection setting;

accepting a second input from the user via the user interface that indicates to the HVAC controller that parameter modification is complete;

after the second input is accepted, providing to the user via the user interface a visually preceptible word or phrase that explicitly indicates that the at least one modified parameter has been, is being or will be saved; and saving the at least one modified parameter.

26. A method of modifying one or more parameters of a programmable HVAC controller, the HVAC controller having a user interface, the method comprising the steps of:

accepting a first input from a user via the user interface to modify at least one of the one or more parameters, wherein at least selected ones of the parameters comprise in combination a time setting and an equipment on/off setting;

accepting a second input from the user via the user interface that indicates to the HVAC controller that parameter modification is complete;

after the second input is accepted, providing to the user via the user interface a visually perceptible word or phrase that explicitly indicates that the at least one modified parameter has been, is being or will be saved; and saving the at least one modified parameter.

27. A method of modifying one or more parameters of a programmable HVAC controller, the HVAC controller having a user interface, the method comprising the steps of:

accepting a first input from a user via the user interface to modify at least one of the one or more parameters;

accepting a second input from the user via the user interface that indicates to the HVAC controller that parameter modification is complete;

after the second input is accepted, providing to the user via the user interface a visually perceptible word or phrase that explicitly indicates that the at least one modified parameter has been, is being or will be saved;

saving the at least one modified parameter; and wherein the providing step of providing the visually perceptible word or phrase to the user via the user interface that the at least one modified parameter has been, is being, or will be saved comprises providing the visually perceptible word or phrase before saving the at least one modified parameter.

28. A method of modifying one or more parameters of a programmable HVAC controller, the HVAC controller having a user interface, the method comprising the steps of:

accepting a first input from a user via the user interface to modify at least one of the one or more parameters;

accepting a second input from the user via the user interface that indicates to the HVAC controller that parameter modification is complete;

after the second input is accepted, providing to the user via the user interface a visually perceptible word or phrase that explicitly indicates that the at least one modified parameter has been, is being or will be saved;

saving the at least one modified parameter; and wherein the providing step of providing the visually perceptible word or phrase to the user via the user interface that the at least one modified parameter has been, is being, or will be saved comprises providing the visually perceptible word or phrase simultaneously with saving the at least one modified parameter.

29. An HVAC controller comprising one or more control parameters, a memory and a user interface, the HVAC controller configured to:

accept a first input from a user via the user interface to modify one or more of the control parameters of the HVAC controller, wherein the one or more control parameters comprises in combination a time setting and a fan setting;

accept a second input from the user via the user interface that indicates to the HVAC controller that parameter modification is complete;

after the HVAC controller accepts the second input, provide a visually perceptible confirmation message to the user via the user interface that includes a word or phrase that explicitly indicates the one or more modified control parameters has been, is being, or will be saved; and save the modified one or more control parameter of the HVAC controller to the memory.

30. The HVAC controller of claim 29, wherein the interface comprises at least one of an alpha numeric display, a touch screen and a keypad.

31. The HVAC controller of claim 29, wherein the interface comprises at least one of a graphical display, a touch screen and a keypad.

32. The HVAC controller of claim 29, wherein the HVAC controller comprises a thermostat.

33. The HVAC controller of claim 29, further configured to display a plurality of control parameters and to permit the user, via the interface, to select a parameter for modification.

34. The HVAC controller of claim 29, wherein the HVAC controller accepts the first input from a keypad or touch screen to allow the user to modify the one or more of the control parameters of the HVAC controller.

35. The HVAC controller of claim 29, wherein the user interface of the HVAC controller includes a button that is touched by the user to accept the second input to indicate to the HVAC controller that parameter modification is complete.

36. The HVAC controller of claim 29, wherein the one or more control parameters further comprises a temperature setpoint.

37. The HVAC controller of claim 29, wherein the one or more control parameters further comprises a humidity setpoint.

38. The HVAC controller of claim 29, wherein the one or more control parameters further comprises in combination a time setting and a temperature setting.

39. The HVAC controller of claim 29, wherein the one or more control parameters further comprises in combination a time setting and a humidity setting.

40. The HVAC controller of claim 29, wherein the visual perceptible confirmation message comprises a text message on an alpha numeric display or a touch screen.

41. The HVAC controller of claim 29, wherein the visually perceptible confirmation message comprises a graphical message or icon on a graphical display.

42. An HVAC controller comprising one or more control parameters, a memory and a user interface, the HVAC controller configured to:
- accept a first input from a user via the user interface to modify one or more of the control parameters of the HVAC controller, wherein the one or more control parameters comprises in combination a time setting and an equipment selection setting;
- accept a second input from the user via the user interface that indicates to the HVAC controller that parameter modification is complete;
- after the HVAC controller accepts the second input, provide a visually perceptible confirmation message to the user via the user interface that includes a word or phrase that explicitly indicates the one or more modified control parameters has been, is being, or will be saved; and
- save the modified one or more control parameter of the HVAC controller to the memory.

43. An HVAC controller comprising one or more control parameters, a memory and a user interface, the HVAC controller configured to:
- accept a first input from a user via the user interface to modify one or more of the control parameters of the HVAC controller, wherein the one or more control parameters comprises in combination a time setting and an equipment on/off setting;
- accept a second input from the user via the user interface that indicates to the HVAC controller that parameter modification is complete;
- after the HVAC controller accepts the second input, provide a visually perceptible confirmation message to the user via the user interface that includes a word or phrase that explicitly indicates the one or more modified control parameters has been, is being, or will be saved; and
- save the modified one or more control parameter of the HVAC controller to the memory.

44. A method of modifying one or more parameters of a programmable HVAC controller schedule, the HVAC controller having a user interface that includes a display, the method comprising the steps of:
- displaying one or more parameters on the display;
- allowing a user to modify at least one of the one or more parameters via the user interface;
- displaying at least one of the one or more modified parameters on the display;
- saving the at least one modified parameter; and
- providing a confirmation message that includes one or more words displayed on the display that conveys to the user that the one or more modified parameters has been, is being, or will be saved, and also displaying in combination with the confirmation message, at least one day of a week of the HVAC controller schedule that corresponds to the at least one modified parameter.

45. The method of claim 44 further comprising the step of allowing a user to indicate via the user interface that parameter modification is complete prior to providing the confirmation message.

46. The method of claim 44 wherein the confirmation message is provided at the same time that the one or more modified parameters are displayed.

47. The method of claim 44 wherein the confirmation message is provided on the display for at least one second.

48. The method of claim 47 wherein the confirmation message is provided on the display for at least five seconds.

49. The method of claim 44 wherein the confirmation message further includes one or more icons displayed on the display that conveys to the user that the one or more modified parameters has been, is being, or will be saved.

50. A method of modifying one or more parameters of a programmable HVAC controller schedule, the HVAC controller having a user interface that includes a display, the method comprising the steps of:
- displaying one or more parameters on the display;
- allowing a user to modify at least one of the one or more parameters via the user interface;
- displaying at least one of the one or more modified parameters on the display;
- saving the at least one modified parameter; and
- providing a confirmation message on the display that notifies the user that the one or more modified parameters has been, is being, or will be saved, and also displaying in combination with the confirmation message, at least one day of a week of the HVAC controller schedule that corresponds to the at least one modified parameter, wherein the confirmation message includes the message "Saving Changes".

51. A method of modifying one or more parameters of a programmable HVAC controller schedule, the HVAC controller having a user interface that includes a display, the method comprising the steps of:
- displaying one or more parameters on the display;
- allowing a user to modify at least one of the one or more parameters via the user interface;
- displaying at least one of the one or more modified parameters on the display;
- saving the at least one modified parameter; and
- providing a confirmation message on the display that notifies the user that the one or more modified parameters has been, is being, or will be saved, and also displaying in combination with the confirmation message, at least one day of a week of the HVAC controller schedule that corresponds to the at least one modified parameter, wherein at least one of the one or more modified parameters are not displayed at the same time as the confirmation message.

52. The method of claim 51 wherein none of the one or more modified parameters are displayed at the same time as the confirmation message.

53. A method of modifying one or more parameters of a programmable HVAC controller schedule, the HVAC controller having a user interface, the method comprising the steps of:
- accepting one or more parameter changing inputs from a user via the user interface to modify at least one of the one or more parameters;
- after each parameter changing inputs is accepted, not providing an indication to the user via the user interface that indicates the one or more modified parameters have been or will be saved;
- accepting a parameter modification complete input from the user via the user interface that indicates to the HVAC controller that parameter modification is complete; and after the parameter modification complete input is accepted, displaying a confirmation message to the user on a display of the user interface that indicates the one or more modified parameters has been, is being, or will be saved, and also displaying on the display in combination with the confirmation message, at least one day of a week of the HVAC controller schedule that corresponds to at least one modified parameter; wherein when the confirmation message is displayed on the display, only the confirmation message and the at least one day of the week that corresponds to the at least one modified parameter are displayed on the display.

* * * * *